US012595887B2

(12) United States Patent
Ruth

(10) Patent No.: US 12,595,887 B2
(45) Date of Patent: Apr. 7, 2026

(54) MIXED-HALIDE PEROVSKITE SPECTRA GENERATORS

(71) Applicant: Anthony Ruth Consulting LLC, Dallas, TX (US)

(72) Inventor: Anthony Ruth, Dallas, TX (US)

(73) Assignee: Anthony Ruth Consulting LLC, Dallas, TX (US)

( * ) Notice: Subject to any disclaimer, the term of this patent is extended or adjusted under 35 U.S.C. 154(b) by 0 days.

(21) Appl. No.: 19/240,949

(22) Filed: Jun. 17, 2025

(65) Prior Publication Data

US 2025/0383056 A1 Dec. 18, 2025

Related U.S. Application Data

(60) Provisional application No. 63/660,788, filed on Jun. 17, 2024.

(51) Int. Cl.

| | |
|---|---|
| ***H05B 47/10*** | (2020.01) |
| ***F21S 8/00*** | (2006.01) |
| ***H05B 47/11*** | (2020.01) |

(52) U.S. Cl.

CPC .............. *F21S 8/006* (2013.01); *H05B 47/11* (2020.01)

(58) Field of Classification Search

CPC ........ H05B 45/10; H05B 47/10; H05B 47/11; F21S 8/006

See application file for complete search history.

(56) References Cited

FOREIGN PATENT DOCUMENTS

| | | | |
|---|---|---|---|
| CN | 118308101 A * | 7/2024 | ......... H10H 20/8512 |
| WO | WO-2017195062 A1 * | 11/2017 | ............. H05B 33/14 |

* cited by examiner

*Primary Examiner* — Jimmy T Vu

(74) *Attorney, Agent, or Firm* — Pillsbury Winthrop Shaw Pittman LLP

(57) ABSTRACT

A system may include a first emitter that includes a first mixed halide perovskite film that includes a first type mixed halide perovskite material that possesses a first usable photoemission wavelength range. The system may include a first excitation device that is positioned adjacent to the mixed halide perovskite film based on an excitation mode of the first excitation device. The first excitation device is configured to tune, based on a first instruction, the first mixed halide perovskite film to emit a first photoemission peak within the first usable photoemission wavelength range, and tune, based on a second instruction, the first mixed halide perovskite film to emit a second photoemission peak within the first usable photoemission wavelength range. The second photoemission peak has at least one of a different width or center within the first usable photoemission wavelength range than the first photoemission peak.

18 Claims, 16 Drawing Sheets

10

500

1100

MIXED-HALIDE PEROVSKITE SPECTRA GENERATORS

CROSS-REFERENCES TO RELATED APPLICATIONS

This application claims the benefit of priority of Provisional U.S. Patent Application Ser. No. 63/660,788, filed 17 Jun. 2024, which is incorporated herein by reference in its entirety for all purposes.

BACKGROUND

Technical Field

The present disclosure generally relates to systems and methods for solar simulation, and in particular to systems and methods for solar simulation with a mixed-halide perovskite spectra generator.

Description of Related Art

Solar simulators are widely used in scientific, industrial, and commercial settings to replicate natural sunlight under controlled conditions. These devices emit electromagnetic radiation across a range of wavelengths that approximate the spectral power distribution of sunlight at the Earth's surface, often modeled on standardized solar spectra such as Air Mass 1.5 Global (AM1.5G). Solar simulators enable consistent and repeatable testing of photovoltaic devices, optical materials, and chemical processes that are influenced by solar radiation. Common applications include the evaluation of solar cell efficiency, accelerated material aging studies, photochemical reaction testing, and calibration of light-sensitive instrumentation.

Conventional solar simulators typically employ xenon arc lamps, metal halide lamps, or, more recently, light-emitting diodes (LEDs) to generate a light source with an appropriate spectral match, intensity uniformity, and temporal stability. The performance of a solar simulator is often classified in accordance with standards such as ASTM E927 or IEC 60904-9, which define criteria for spectral accuracy, irradiance uniformity, and stability over time. Despite ongoing improvements, existing simulators may suffer from issues such as high-power consumption, limited tunability, spectral mismatches, or non-uniform irradiance across the test plane. These limitations can reduce measurement accuracy and hinder reliable testing of advanced solar technologies.

SUMMARY

The following is a non-exhaustive listing of some aspects of the present techniques. These and other aspects are described in the following disclosure.

In some aspects, the techniques described herein relate to a system, including: a first emitter that includes: a first mixed halide perovskite film that includes a first type mixed halide perovskite material that possesses a first usable photoemission wavelength range; and a first excitation device that is positioned adjacent to the first mixed halide perovskite film based on an excitation mode of the first excitation device and the first excitation device is configured to: tune, based on a first instruction, the first mixed halide perovskite film to emit a first photoemission peak within the first usable photoemission wavelength range; and tune, based on a second instruction, the first mixed halide perovskite film to emit a second photoemission peak within the first usable photoemission wavelength range, wherein the second photoemission peak has at least one of a different width or center within the first usable photoemission wavelength range than the first photoemission peak.

In some aspects, the techniques described herein relate to a system, including: a controller; a driver that is coupled to the controller, that receives instructions from the controller, and that is configured to control voltage characteristics of a signal; and an electroluminescent emitter device that is coupled to an output of the driver to receive the signal and that includes: a light source; and a mixed halide perovskite film positioned adjacent to the light source such that photoemission emitted from the light source excites the mixed halide perovskite film to generate a photoemission peak of a usable photoemission wavelength range of a type of mixed halide perovskite material used in the mixed halide perovskite film.

In some aspects, the techniques described herein relate to a process, including any of the above-mentioned processes performed by the systems.

Some aspects include a tangible, non-transitory, machine-readable medium storing instructions that when executed by a data processing apparatus cause the data processing apparatus to perform operations including the above-mentioned processes performed by the systems.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
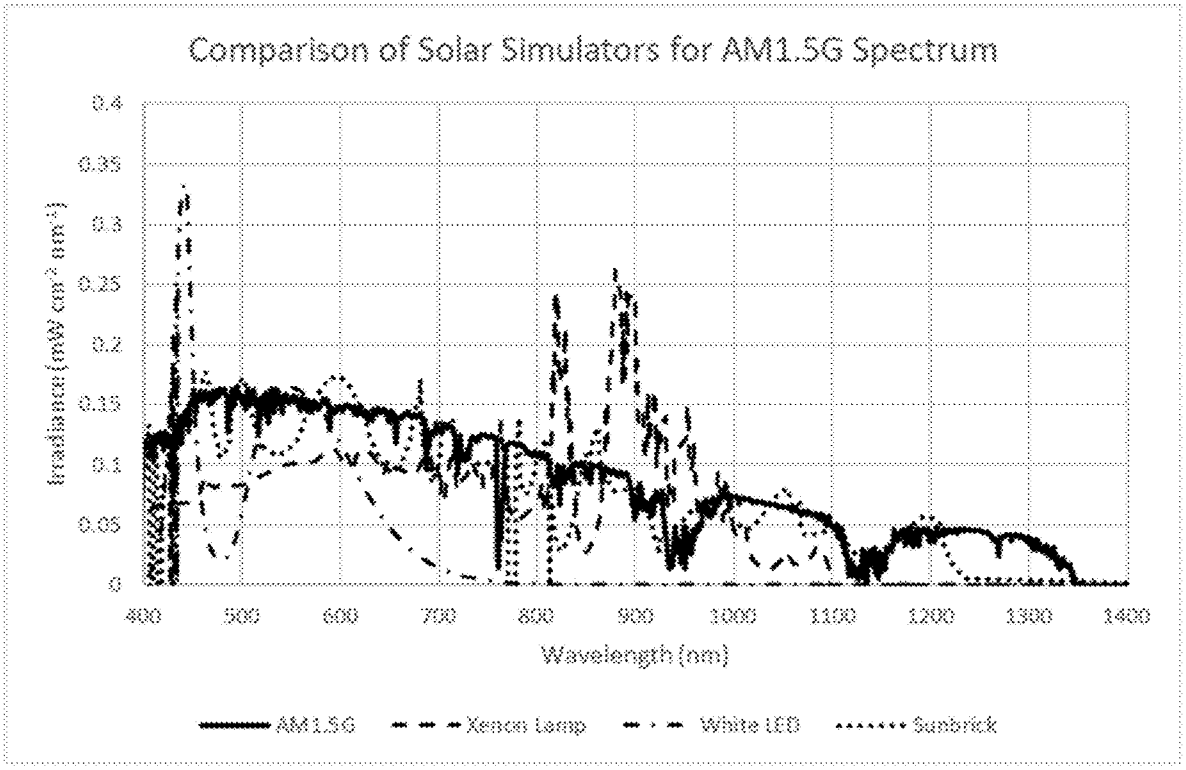
FIG. 1 Prior Art
FIG. 1 illustrates a graph of a standard illumination spectrum (e.g., AM1.5) versus various prior art artificial light sources in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of solar simulators and mixed-halide perovskites. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Modern lighting technologies are capable of producing sufficient luminous output to illuminate indoor environments and enable navigation in low-light conditions. However, significant limitations remain regarding the spectral quality of artificial light, particularly in efforts to replicate the solar spectrum. Sunlight that reaches the Earth's surface predominantly falls within the 300 to 1600 nm wavelength range and is characterized by numerous atmospheric absorption features that create pronounced spectral valleys. Achieving a Class A+solar spectral match—the highest classification currently recognized by the International Electrotechnical Commission (IEC)—requires compliance with integrated spectral intensity limits across six defined bands: 300-470 nm, 470-561 nm, 561-657 nm, 675-772 nm, 772-919 nm, and 919-1200 nm. Within these bands, the maximum permissible error in integrated spectral intensity is 12.5%. The IEC acknowledges that even advanced solar simulators may be unable to substantially exceed the performance required for this classification. Challenges in spectral matching are also observed in narrower spectral subsets, which are often targeted in applications that do not require full-spectrum solar replication. The techniques and systems described herein are not limited to addressing only the aforementioned challenges, but may also be applied to solve additional problems or improve performance in specialized contexts as will be apparent to those of ordinary skill in the art based on the present disclosure.

Some embodiments of the present disclosure are expected to go beyond currently achievable spectral fidelity, so a higher standard for calculating spectral error is also helpful to quantify the relative differences exhibited by some embodiments discussed below. It may be helpful to use a quantitative metric which accounts for the error in the irradiance within 1 nm spectral bands between the target spectrum and the achieved spectrum. An intuitive metric would be the average or root-mean-square relative error of each band. It should be noted however, that due to deep atmospheric absorption features in sunlight, the relative spectral error in some bands would be exceptionally large and this metric would more heavily emphasize depleted regions of the spectrum than bright portions.

Therefore, it may be helpful to use a scheme which weights by the absolute spectral error in each band but normalizes to the integrated spectrum to express the result as a percent error. An expression for this error is then:

$$E = \frac{\sqrt{\sum_{i=\lambda_{min}}^{\lambda_{max}} (S_i - I_i)^2}}{\sqrt{\sum_{i=\lambda_{min}}^{\lambda_{max}} I_i^2}} \quad (1)$$

In equation (1), $I_i$ is the target spectrum over the wavelength range $[\lambda_{min}, \lambda_{max}]$(where λ refers to wavelength of light) and Si is the spectrum produced by the solar simulator over the same wavelength range. Both Si and I; are expressed as irradiance with units of $$[S_i] = [I_i] = \text{mW cm}^{-2}\text{ nm}^{-1} \quad (2)$$

One type of solar simulator (e.g., a light source that emits light approximating solar spectrum) is fluorescent lamps. A Xenon lamp may produce emission throughout the majority of the visible range and when operated at a high temperature, the radiative emission picks up the peak wavelength and blackbody emission lineshape similar to the sun. However, major peaks and valleys are often nonexistent or appear where they should not be. Light emitting diodes (LEDs) typically have a characteristic emission color, however white LEDs are often commercially made by starting with a blue LED and down converting a substantial portion of the emitted light through fluorophores broadening the emission towards something approaching a blackbody spectrum. A constructive approach has also been made to produce solar simulators by juxtaposing multiple LEDs with different emission spectra. FIG. 1 illustrates a graph 10 of a standard illumination spectrum (e.g., AM1.5) versus prior art artificial light sources such as a Xenon lamp that has a 54% error, "white" LED with a 75.5% error, an LED-constructed spectrum with 27% error. The errors are reported for the 430-1350 nm range.

Embodiments of the present disclosure produce a close match to true sunlight (or other target spectra). Some embodiments utilize a single class (or more than one class) of color-tunable materials which in some cases may have highly advantageous properties for this function: organic metallic mixed-halide perovskites. In particular, these materials have high luminescent quantum yields which are further enhanced by the "carrier funneling" effect and have an emission color and which can be controlled via the operating condition of the material as described in the "photosegregation" effect and "photomixing" effect (also referred to "photoremixing" effect herein), in some embodiments. Furthermore, emission peak widths are minimized (or reduced) by the "bandgap homogenization" effect which significantly aides spectrum fitting.

These materials may have composition (e.g., chemical formula of a crystallographic structure in the form of a perovskite) ABX3 (where A is an alkali or pseudoalkali: A=methylammonium (MA+), formamidinium (FA+), Guanadinium (GA+), Cesium (Cs+), Rubidium (Rb+) or an alloy thereof: B=Lead (Pb2+) or Tin (Sn2+), and X is a halide or pseudohalide: X=Fluoride (F−), Chloride (Cl−), Bromide (Br−), Iodide (I−), Formate (Fo−), or Thiocyanate (TC−) or an alloy thereof). The emission wavelength of single emitters can, in some embodiments, be tuned both by the halide alloy of the material as well as the carrier injection level. Multiple individual emitters may be excited within the same film with each emitter producing a separate color.

Figure 2:
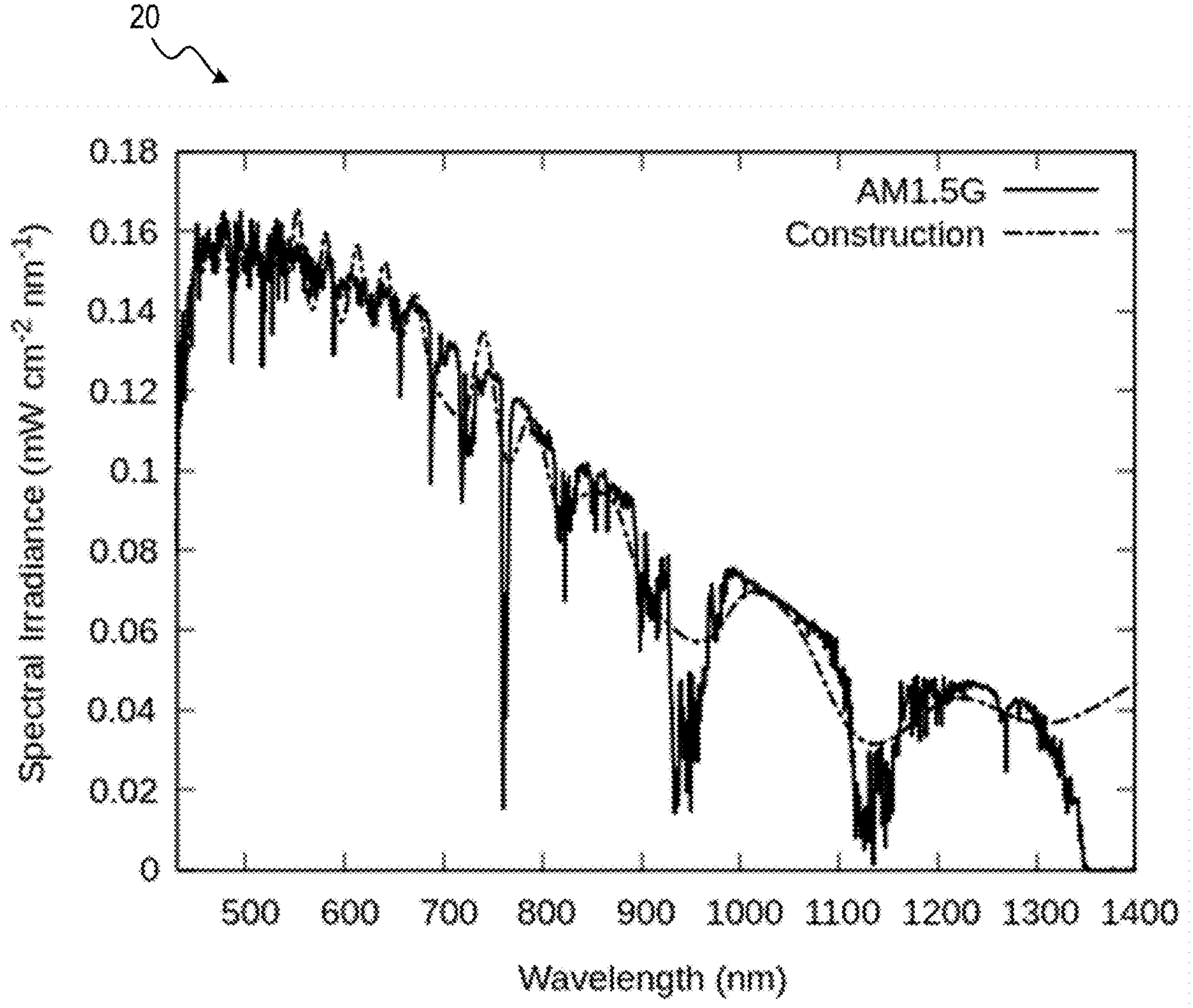
FIG. 2 illustrates a graph of a constructed spectrum formed within an example model mixed halide perovskite material in accordance with some embodiments of the present disclosure.

FIG. 2 illustrates a graph 20 of a constructed spectrum formed within an example model mixed halide perovskite material meant to capture the breadth of achievable bandgaps between 0.8 and 3.2 eV and interrelatedness of carrier injection level, emission wavelength, and emission peak width. Namely, in this example, the emission peak wavelength increases with carrier injection level while the peak width remains small from the photosegregation phenomenon. However, at high carrier injection levels, in this example, photomixing begins which reduces the emission peak wavelength while first increasing and then substantially decreasing the peak width. While this model oversimplifies the construction as a single material, it also underestimates the capability to reduce spectral error through additional sharply-peaked emitters that would come from using multiple perovskite compositions. These sharply-peaked emitters would substantially fill in poorly-fit regions of the spectrum.

In the specific modeled constructed spectrum of the graph 20 of FIG. 2, 127 mixed-halide emitters were used with an emission peak range of 385 nm to 1550 nm optimized to approximate the solar spectrum within the 430 to 1350 nm range. The spectral match shown in FIG. 2 has an error of 3.8% over the 430 to 1350 nm range as calculated by equation 1.

Figure 3:
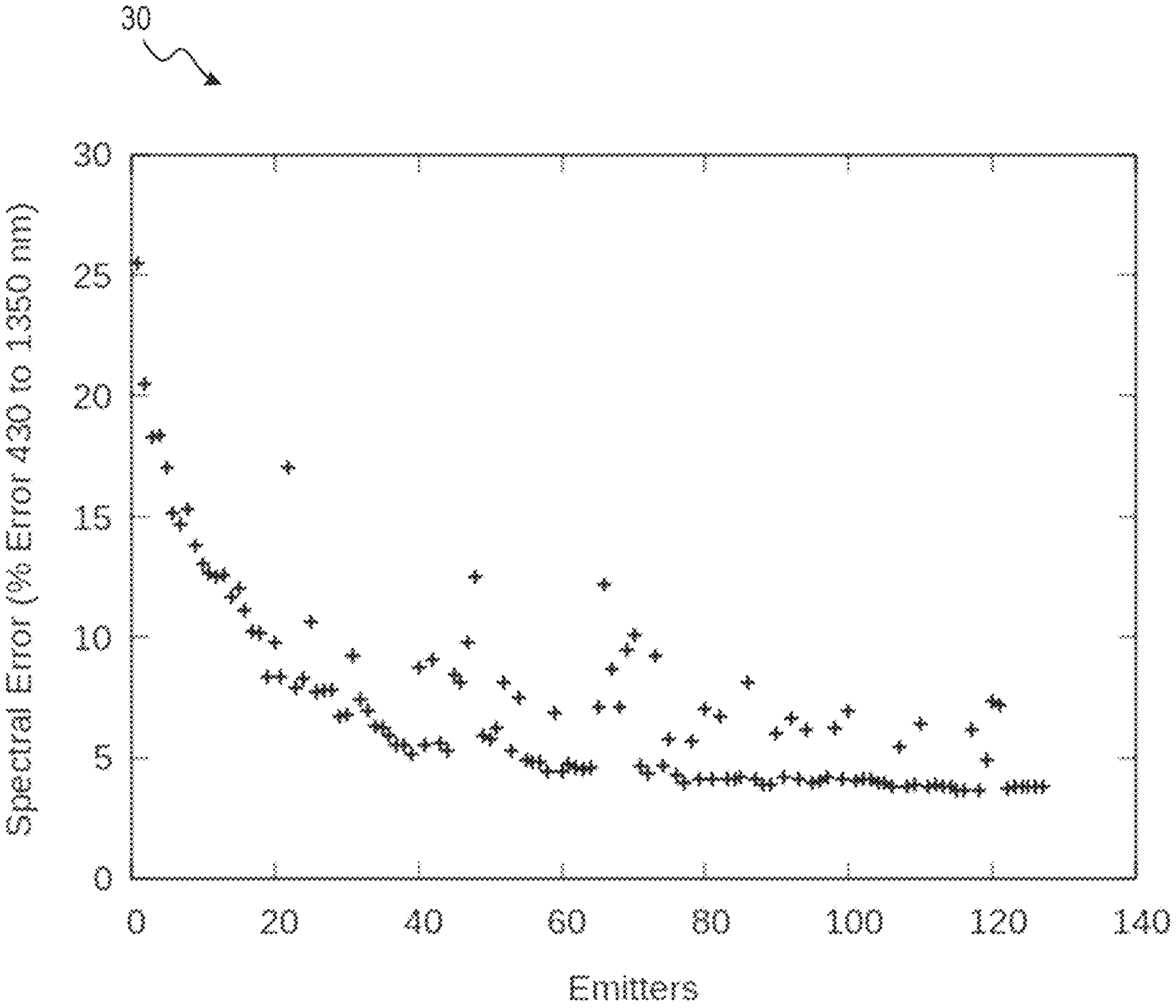
FIG. 3 illustrates a graph of the percent error of calculated spectra of some embodiments versus the number of emitters, in accordance with some embodiments of the present disclosure.

FIG. 3 illustrates a graph 30 of the percent error of calculated spectra of some embodiments versus the number of emitters. The graph 30 illustrates the spectral error relative to AM1.5G Standard illumination spectrum versus number of emitters assuming an emission peak range of 385 nm to 1550 nm optimized to best match the solar spectrum within the 430 to 1350 nm range. The optimization algorithm started with a single emitter and performed a gradient descent to find a local minimum in the carrier injection level. Each subsequent emitter was added one at a time starting with a random injection level and all emitters were optimized by gradient descent. As this is a local minimum finding routine, the solution is not necessarily a global minimum.

Various ranges may be targeted depending on the use case. Examples include: tandem solar cells with spectral fidelity in the 350-1140 nm range, spectrum matching within the human visual acuity range (400-700 nm), chlorophyll matching (400 to 500 nm and 650 to 680 nm), "soft" illumination (550-1000 nm), water-penetrating lighting (350-450 nm), biochemical (550-850 nm), or other ranges that would be apparent to one of skill in the art in possession of the present disclosure. Within the natural sciences as a scientific tool a helpful scenario is a high-fidelity light source with quantifiable spectral fidelity over as wide a range as possible (200-1800 nm).

Furthermore, as the solar spectrum changes throughout the day/year as well as with the latitude and altitude, some embodiments may produce multiple spectra at different times, e.g., responsive to control signals from a controller having a clock and executing a program by which such updates are applied, e.g., with a formula or lookup table. It is expected that this function may be especially useful for biological systems, which are known to synchronize their internal clock in response to changes in the illumination spectrum. Indeed, while it is known that a bluer spectrum is stimulating while a redder spectrum promotes sleep, devices that targeted this effect have generally been limited in the accuracy of their spectrum. For instance, some embodiments may apply the spectra and modulations described in Patterson et. Al, A Color Vision Circuit for Non-Image-Forming Vision in the Primate Retina, in Cell, VOLUME 30, ISSUE 7, P1269-1274.E2, Apr. 6, 2020, available at https://doi.org/10.1016/j.cub.2020.01.040, the contents of which are hereby incorporated by reference, to obtain the biological effects described therein. As a broad classification, study and control of photochemical processes in biological systems are expected to greatly benefit from this light source.

The illumination spectrum may, in some cases, be further modified by environmental factors such as cloud coverage as well as surface and ground albedo. The right color spectrum may form an effective trap for pest insects and animals.

In some cases, no single mixed-halide material may fully cover the targeted range, but the range may be covered with multiple material compositions, as discussed below. The emission spectrum produced through the combination of all emitters in this approach is significantly closer to the solar spectrum than that produced via adding many disparate LEDs together. The disparate LEDs may have differing emission peak widths and non-uniform and uncontrolled spacing in emission peak wavelength, which makes creating an optimal choice of LEDs difficult. Furthermore, the improvement that can be realized from adding an additional LED to an existing solution is marginal because of overlap between the spectra of the emitters. In contrast (which is not to imply that the present techniques may not also be used with LEDs), the emission peak of the single emitters within the perovskite film is tunable. As additional emitters are added other existing emitters can have their peak wavelength adjusted. Furthermore, since the emitters are in close proximity, the light produced can be treated as a point source making this light source focusable. Being a point source also minimizes the number of discrete emitters that need to be controlled as the disparate LED case requires many LEDs of each color in order to balance out spatial nonuniformities.

Figure 4:
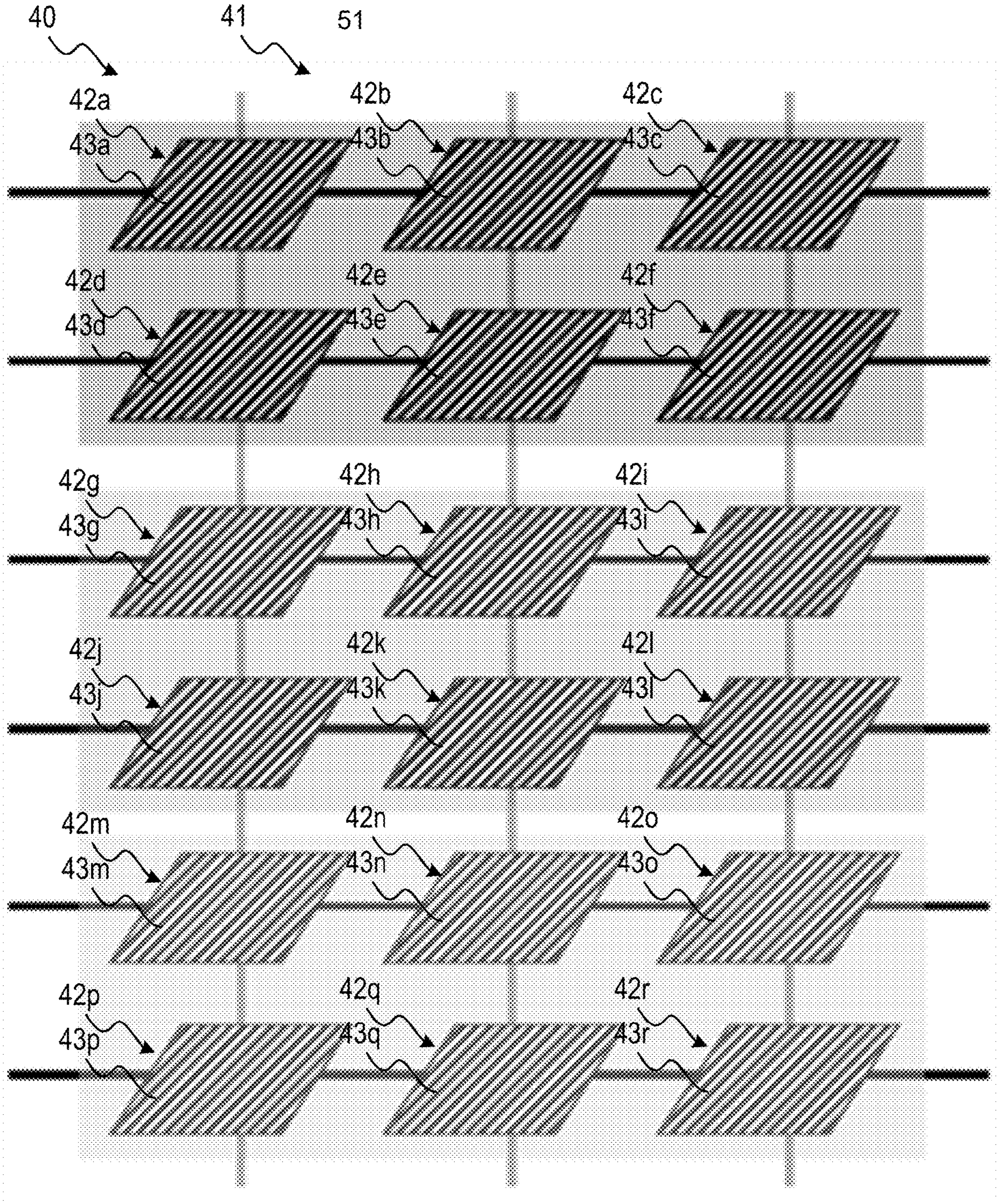
FIG. 4 illustrates an example architecture of a mixed-halide perovskite based arbitrary spectrum generator, in accordance with some embodiments of the present disclosure.

FIG. 4 illustrates an example architecture 40 of a mixed-halide perovskite based arbitrary spectrum generator that may include an array 41 of individually addressable pixels 42*a*-42*r* that inject carriers into mixed-halide perovskite emitters 43*a*-43*r*. In some embodiments, several emitters are within each perovskite composition (e.g., at each addressable pixel). Each emitter 43*a*-43*r*, in some embodiments, produces different emission peak wavelength and peak width based on the perovskite composition and the applied injection level for that emitter. In some cases, each pixel 42*a*-42*r* may have a respective instance of the same set of emitters, or different pixels may have different emitters configured to emit at different wavelengths than those in other pixels. In some embodiments, the above architecture may be used for a factory-fixed spectrum and in some embodiments, the above architecture may be used to produce multiple discrete spectra with the same pixels. Finally, in some embodiments, the above architecture 40 may be used to produce arbitrary spectra. Depending on use case, there are many ways to drive the emitters 43*a*-43*r*: dedicated analog output for each emitter, a multiplexing scheme setting latch circuits for each channel, factory-set impedance control, time-split PWM (pulse-width modulation) driving.

Embodiments of the present disclosure may have many use cases. For example, the mixed-halide perovskite spectra generator may provide for factory-fixed light sources (direct sunlight: AM1.5G, AM1, AM0, AM2, dusk/dawn: AM3, AM4, AM7), daylight simulators (AM4 at dusk and dawn, AM3, AM2, AM1, etc. in the middle), arbitrary spectrum generators-advanced scientific tool, reprogrammable on the fly-true color displays (like an LED display but better spectral fidelity), (e.g., in televisions, monitors, watch faces, virtual reality or augmented reality displays, and the like), plant grow lights, pest control, forensic contrast highlighting of certain substances, and other use cases that would be apparent to one of skill in the art in possession of the present disclosure.

Another use of aspects of the present disclosure involves hyperspectral imaging. Existing hyperspectral imaging systems commonly utilize broad-spectrum (white) illumination sources in combination with electrically tunable optical filters to isolate individual wavelength bands. These tunable filters are often complex and cost-prohibitive and operate by sequentially rejecting the majority of incident spectral content, resulting in significant inefficiencies. In contrast, aspects of the present disclosure enable direct tuning of the excitation light wavelength, eliminating the need for downstream filtering and thereby increasing signal strength while reducing system cost and complexity. Additionally, existing tunable filters typically exhibit broad transmission bandwidths, whereas the disclosed light source architecture is capable of producing emission peaks with narrower spectral widths, offering improved spectral resolution for hyperspectral imaging applications.

Another advantageous use case for aspects of the present disclosure is in fiber-optic-based structural health monitoring systems. Such systems are employed in critical infrastructure, including dams, pipelines, subsea cables, and large buildings, where they enable distributed sensing of mechanical parameters such as strain along the length of an optical fiber. The implementation of a color-tunable, coherent light source within these systems would provide substantial performance enhancements. In particular, wavelength tuning of the excitation light allows for spatial discrimination of localized responses along the fiber, thereby enabling more precise identification of structural anomalies or stress concentrations. The disclosed light source offers tunability and coherence characteristics that are well-suited to improve resolution and diagnostic capability in such distributed fiber sensing networks.

A mixed-halide perovskite spectra generator may include the perovskite in various form factors. For example, the perovskite crystal structure may be formed in place by depositing precursors and converting to form a thin film. The film thickness may be of 30-3000 nm. The film may be formed by spin-coating, formed by blade coating, formed by slot-die coating, formed by thermal evaporation, formed by sputtering, converted by thermal annealing, converted by microwave annealing, converted by antisolvent method, deposited in a one-step process whereby a crystal is precipitated from a solvated solution containing alkali, lead, and halide ions, deposited in two or more coats containing lead halide and an alkalihalide or pseudoalkali halide, or other fabrication processes that would be apparent to one of skill in the art. In the fabrication process where two or more coats are deposited, both coats may be made using solution-processing techniques or using dry processing techniques, or when at least one coat is made using a dry process and at least one coat is made using a wet process. In some embodiments, a crystal of perovskite structure is synthesized and then mounted in a device. In some embodiments, multiple crystals of perovskite are synthesized and then deposited as a colloidal film. In some embodiments, the crystals may be nanocrystals (<30 nm in all dimensions), the crystals may be nanowires (<30 nm in two dimensions), the crystals may be nanoplatelets (<30 nm in one dimension, or those crystals may be microplatelets (>1 μm in two dimensions).

In some embodiments, device architectures include when carriers are injected into the perovskite through electrical connections. For example, the device architecture may be NIP (N-type layer, intrinsic layer, P-type layer)—common perovskite device architectures featuring an n-type transition metal oxide (SnO2 or TiO2) electron transport layer grown on a transparent conducting electrode (ITO or FTO), followed by an intrinsic perovskite photoactive layer, and a p-type organic (spiro-OMETAD, PTAA) or inorganic (NiOx) hole transport layer. In other examples, the device architecture may be PIN-common perovskite device architecture featuring a p-type organic (PTAA, SAMs) or inorganic (NiOx) hole transport layer grown on a transparent conducting electrode (ITO or FTO), followed by an intrinsic perovskite photoactive layer, and a n-type organic (C60, PCBM, BCP) or inorganic (SnO2) hole transport layer. Another example device architecture may include architectures when the carriers are injected into the perovskite through photoabsorption. The perovskite may be illuminated as a fluorophore-a device architecture where an underlying hard semiconductor (III-V or II-VI) provides the initial light and pixel addressing, but a perovskite down converts the light and determines the final emitted color. This may be used for QLEDs.

In various embodiments of the present disclosure various perovskite compositions may be used in the film(s). For example, these perovskite compositions may include $MAPb(I_{1-x}Br_x)_3$—The entire range of [0.2<x<0.9] is usable, where MA refers to methylammonium. In some embodiments, a range of [0.15<x<0.95] may be contemplated. Below x=0.2, there may be insufficient driving force for photosegregation.

Above x=0.9, the kinetics of I-rich domain nucleation may become extremely slow and unusable. Another perovskite composition may include $MAPb(Br_{1-x}Cl_x)_3$, where MA refers to methylammonium. Where a range [0.2<x<0.9] is usable. Another perovskite composition may include $MAPb(I_{1-x-y}Br_xCl_y)_3$, where MA refers to methylammonium. The range of iodine concentrations which result in photosegregation in cubic perovskites is extended because of larger bandgap differences between I and Cl. However, it may be the case that the extremes (I and Cl) are immiscible without Br to bridge the size range. Some embodiments may use the ranges of [0.15<x<0.95] and [0.15<y<0.95]. In various embodiments, another perovskite composition may include $FAPb(I_{1-x-y}Br_xCl_y)_3$, where FA refers to formamidinium. This results in a slightly lower bandgap than $MAPb(I_{1-x-y}Br_xCl_y)_3$ due to FA being a little bit larger than MA. However, pure FA is rare because it is a bit too large for the structure it inhabits and favors a hexagonal phase over the necessary cubic phase. It may be the case that cubic FAPbI3 can be kinetically stable, some embodiments may include pure FA. In various embodiments, another perovskite composition may include $CsPb(I_{1-x-y}Br_xCl_y)_3$-pure Cs is a stable means to increase the bandgap a little bit. A pure inorganic material has certain advantages for stability and processing and works well in nanocrystals. Cs is a little bit too small for iodine and CsPbI3 is orthorhombic, but Cs works well for bromine, I/Br mixtures, Cl and Br/Cl mixtures. It does tend to have reduced photocarrier lifetime, however compared to perovskites containing organic cations. In yet another embodiment, the perovskite composition may include $FA_{1-t}$ CS: $Pb(I_{1-x-y}Br_xCl_y)_3$, where FA refers to formamidinium-$FA_{1-t}Cs_tPbI3$ may be used for single-junction perovskite solar cells. Example compositions include: $FA_{0.85}Cs_{0.15}Pb(I_{0.4}Br_{0.4}Cl_{0.2})_3$, $FA_{0.85}Cs_{0.15}Pb(I_{0.2}Br_{0.4}Cl_{0.4})_3$, $FA_{0.85}Cs_{0.15}Pb(I_{0.6}Br_{0.2}Cl_{0.2})_3$. $FA_{0.85}Cs_{0.15}Pb(I_{0.2}Br_{0.2}Cl_{0.6})_3$, $FA_{0.85}Cs_{0.15}Pb(I_{0.2}Br_{0.75}Cl_{0.05})_3$, $FA_{0.95}Cs_{0.05}Pb(I_{0.4}Br_{0.4}Cl_{0.2})_3$ In yet another embodiment, the perovskite composition may include $Cs_{1-t}Rb_tPb(I_{1-x-y}Br_xCl_y)_3$—As an all-inorganic option that may be used in some embodiments. In yet another embodiment, the perovskite composition may include $FA_{1-t-u}MA(CsuPb(I_{1-x-y}Br_xCl_y)_3$ where MA refers to methylammonium and FA refers to formamidinium—may be used in some embodiments. In yet another embodiment, the perovskite composition may include $FA_{1-t-u-v}MA_tRb_uCs_vPb(I_{1-x-y}Br_xCl_y)_3$ where MA refers to methylammonium and FA refers to formamidinium. In yet another embodiment, the perovskite composition may include $GAPb(I_{1-x-y}Br_xCl_y)_3$ where GA refers to guanidinium-GA is a bit larger still than FA and may be useful for lower bandgaps or in conjunction with pseudohalides. In yet other embodiments, tin-based perovskites-gives a significantly lower bandgap than lead and may be used in some embodiments. In yet other embodiments, the perovskite composition may include $Cs_{0.8}FA_{0.2}Pb(Br_{1-x}Cl_x)_3$, $CsPb(Br_{1-x}Cl_x)_3$, $MASn(Br_{1-x}Cl_x)_3$, $MAPb(I_{1-x}(Br_{0.6}Cl_{0.4})_x)_3$, $FA_{0.85}Cs_{0.15}Pb(I_{1-x}Br_x)_3$, $FASn(I_{1-x}Br_x)_3$, or $MASn(I_{1-x}Br_x)_3$.

In some use cases, other compositions may be used. For example, a composition of perovskite may include Ruddleson-Popper (RDP)—2D perovskites containing benzylammonium, butylammonium or phenethylammonium,—A two-dimensional crystal structure of perovskite composition featuring large cations with a positive ammonium group on one side and an aliphatic tail on the other. These can form a 2D/3D hybrid where the 3D part is quantum confined giving an increased bandgap. These materials may be used either as the primary absorber, or as a capping or interlayer between the perovskite and electrodes. They usually have valence band alignment with 3D perovskites. Another perovskite composition may include Dion-Jacobson 2D perovskites-A two-dimensional crystal structure of perovskite composition featuring large cations with two positive ammonium groups on either end of an organic chain. These can form a 2D/3D hybrid where the 3D part is quantum confined giving an increased bandgap. These materials may be used either as the primary absorber, or as a capping or interlayer between the perovskite and electrodes.

Mixed-halide perovskite materials are ionically-active heterogeneous semiconductors. When excited to form electron-hole pairs, the halides within these materials redistribute altering their electronic properties. This minimizes (or reduces) the free energy of photocarriers in accordance with a thermodynamic bandgap model. This behavior is analogous to the erosion of the geological landscape by water. Water not only travels to the lowest accessible point: it also carves deep grooves through the landscape. The alterations made to the landscape affect the way that future water travels, and these changes accumulate over time giving rise to rivers, lakes, and seas. However, unlike erosion, the changes within the perovskite are typically fully reversible.

It is noted that some claim to have suppressed instabilities related to halide segregation. In turn, this implies that the entire spectrally-accessible range of mixed halide perovskites can be used to produce spectrally stable homogenous semiconductors. However, the routes taken have either (1) resulted in other undesirable characteristics such as poor charge carrier lifetime or diffusion rate, (2) slowed but not stopped the effect where instabilities still occur over longer timescales, or (3) produced stability only within a narrow range of emission wavelengths such as the well-known 0 to roughly 20% stability region for the high bandgap halide in the alloy. Some embodiments therefore do not require a spectrally stable mixed halide perovskite, rather a consistent heterogeneous mixed halide perovskite may be used in some embodiments to produce the desired emission spectrum.

The thermodynamic bandgap model can be summarized in terms of 3 behaviors. (1) Photocarriers funnel to the lowest accessible bandgap. If there are sufficient photocarriers to fill the lowest bandgap, then they begin filling the next lowest, etc. The photoemission of the material is produced by the combination of all photocarriers and is nearly equivalent to the bandgap at the locale of the photocarrier. (2) Photocarriers burrow and will produce a region with a lower bandgap than its surroundings via expulsion of halides responsible for a high bandgap and uptake of halides responsible for a low bandgap. (3) Areas that contain photocarriers generally homogenize such that they approach a single consistent bandgap.

The combination of (1) and (2) results in the so-called "photosegregation" phenomenon whereby mixed-halide alloys which are excited will over time produce emission that is red-shifted compared to the initial emission. When (1) and (3) are combined it results in a phenomena termed photomixing whereby the halide composition can be more evenly mixed than the random stochastic process responsible for mixing in the dark. These two phenomena and the other behavior allow for different emission wavelengths/energies depending on the excitation density while at the same time minimizing the emission peak width through the homogenization effect. Notably, both photosegregation and photomixing occur on relatively short timescales of seconds to minutes allowing for their utilization as changing materials in functional devices. In turn, this behavior can be utilized and tuned to produce a light source with useful photoemission.

Figure 5:
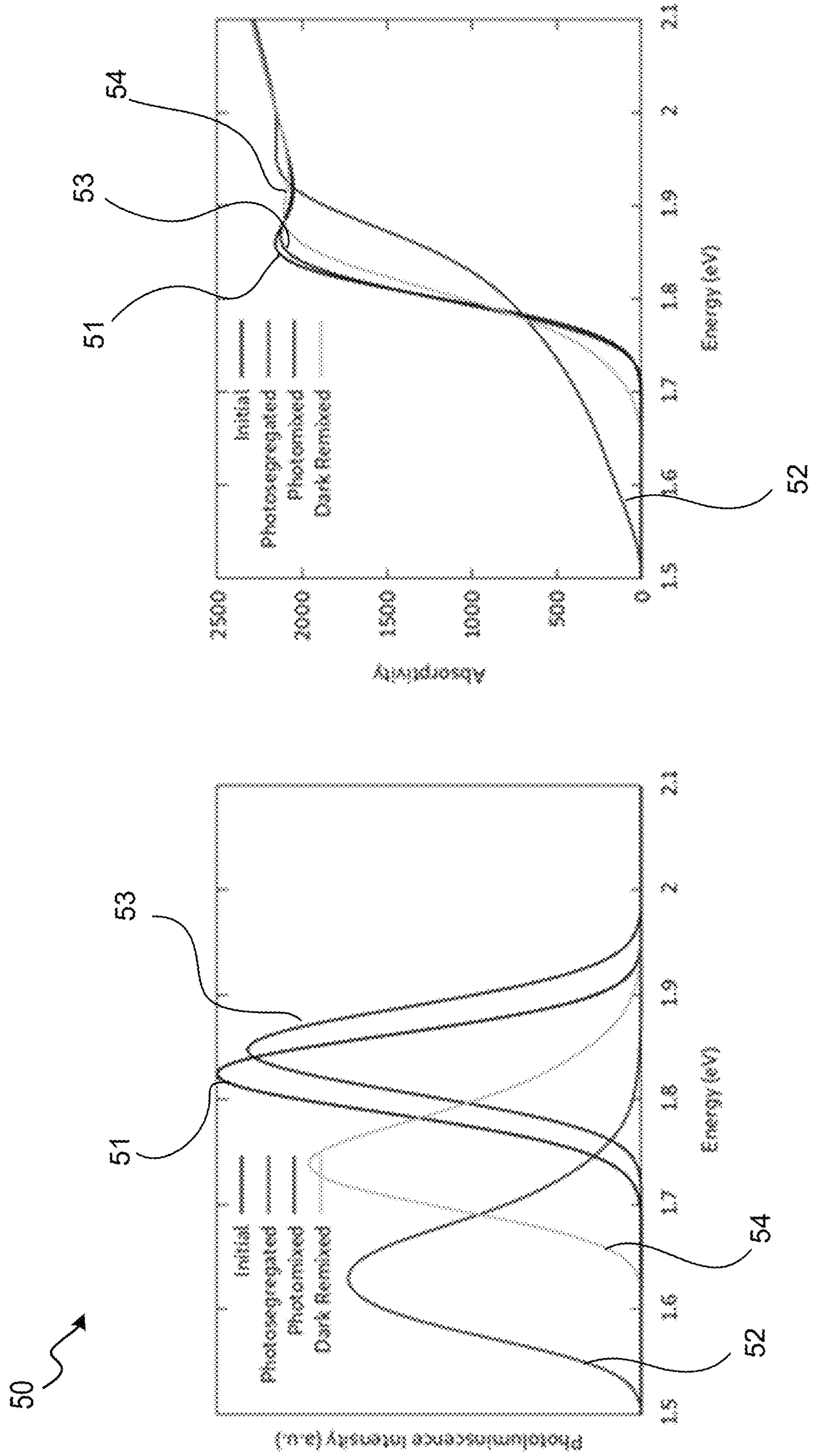
FIG. 5 illustrates graphs of simulations of first photosegregation and then photoremixing within the thermodynamic bandgap model, in accordance with some embodiments of the present disclosure.

FIG. 5 illustrates graphs 50*a* and 50*b* of kinetic Monte Carlo simulations of first photosegregation and then photomixing within the Thermodynamic Bandgap Model. A result of these simulations is the aforementioned significant sharpening of the electronic structure during photomixing due to the propensity for creating a uniformly mixed state. Graph 50*a* illustrates simulations of photoemission spectrum and graph 50*b* illustrates simulations of photoabsorption spectrum of MAPbI1.5Br1.5. Plot 51 illustrates an initial state of the mixed halide perovskite. Simulations were first photosegregated at a low injection level (plot 52) and then photomixed at a high injection level (plot 53). These are compared to simulations of remixing in the dark (plot 54) to distinguish photomixing and dark remixing. It should be noted that these simulations represent a small sliver of the overall phenomenon meant to understand the underlying physics. The MAPb(I1-xBrx)3 was studied starting from MAPbI1.5Br1.5 which subsequently segregates to MAPbI2.4Br0.6 covering a range of 1.65 to 1.83 eV. However, this single alloy can be utilized from MAPbI2.4Br0.6 to MAPbI0.3Br2.7 giving an energy range of 1.65 to 2.18 eV. This same behavior could be used for MAPbBr2.4Cl0.6 to MAPbBr0.3Cl2.7 giving a range of 2.35 to 2.88 eV.

As discussed above is that photosegregation is reversible. When photosegregated films are kept in the dark over a period of hours, original mixed-halide absorption and emission energies/spectra recover. X-ray diffraction measurements confirm this, showing restoration of $I^-/Br^-$ alloying. Dark remixing is attributed to entropically-driven remixing of photosegregated anions. As such, mixed-halide perovskite thin films are quick to photosegregate or red shift but slow to remix in obtain shorter wavelengths (e.g., slow blue shift). Unfortunately, hour long, entropically-driven remixing timescales are impractical for applications to quickly utilize the usable wavelength range of a material such as to obtain a short wavelength photoemission from a shorter wavelength photoemission of photosegregated mixed-halide perovskite.

The inventor of the present disclosure has now discovered that persistent photoremixing can be induced in photosegregated, mixed-halide perovskite thin films in faster time scales using several mechanisms. It has been discovered that while using gradually increasing low-intensity light sources (e.g., 1-50 $uJ/cm^2$) shifts the wavelengths longer and photosegregates the mixed-halide perovskite thin films. Increasing the intensity of the light source by several factors of 10 can achieve photoremixing such that providing high-intensity light has the same effect as darkening on the mixed halide perovskite but the high-intensity light can photoremix the mixed-halide perovskite thin films on much faster time scales (e.g., a matter of seconds or minutes versus hours). One way of using high-intensity light is to use a continuous wave. Using a light source with a continuous wave requires an intensity of 100-10,000 $kW/cm^2$ to obtain photoremixing. However, intensity-based control over the emission wavelength is difficult to achieve. This is because of the huge range of intensities involved ($uW/cm^2$ to $kW/cm^2$). It is difficult to obtain intensities from LEDs that are greater than 1000 $W/cm^2$.

Another intensity-based method to achieve photoremixing includes pulsed illumination. It has been discovered that high intensity, pulsed irradiation induces anion remixing to restore original alloy emission energies. Pulsed irradiation, thin film photoremixing appears universal and has been observed across multiple compositions of a given mixed-halide material. For example, photoremixing has been observed in x=0.67, 0.52, and 0.30 $FACsPb(I_{1-x}Br_x)_3$ thin films. It has also been observed in other mixed-halide perovskite compositions such as $MAPb(I_{1-x}Br_x)_3$ and even in ultrastable, triple cation $FAMACsPb(I_{1-x}Br_x)_3$. For high-speed pulsed illumination, necessary fluences are around 1000-10000 $uJ/cm^2$, which is on a much smaller order of magnitude than continuous wave intensities. The pulses may cover a duty cycle range of at least 0.1% to 10%, but a range as wide as 0.0001% to 100% may achieve better results.

The frequency range for pulse width modulation is clipped at the low end by the rate constant for photosegregation ~1 hz. The estimated maximum frequency is 100 khz, but a more practical limit with our drive circuitry is around 100-1000 hz. The maximum frequency is limited by the requirement to have a pulse width significantly greater than the photocarrier lifetime in the material (>10 ns in our case). This is not strictly necessary, but using a pulse width on par with the photocarrier lifetime requires reducing the duty cycle by up to 2 orders of magnitude (and intensity by the same) to achieve the same emission wavelength.

Figure 6:
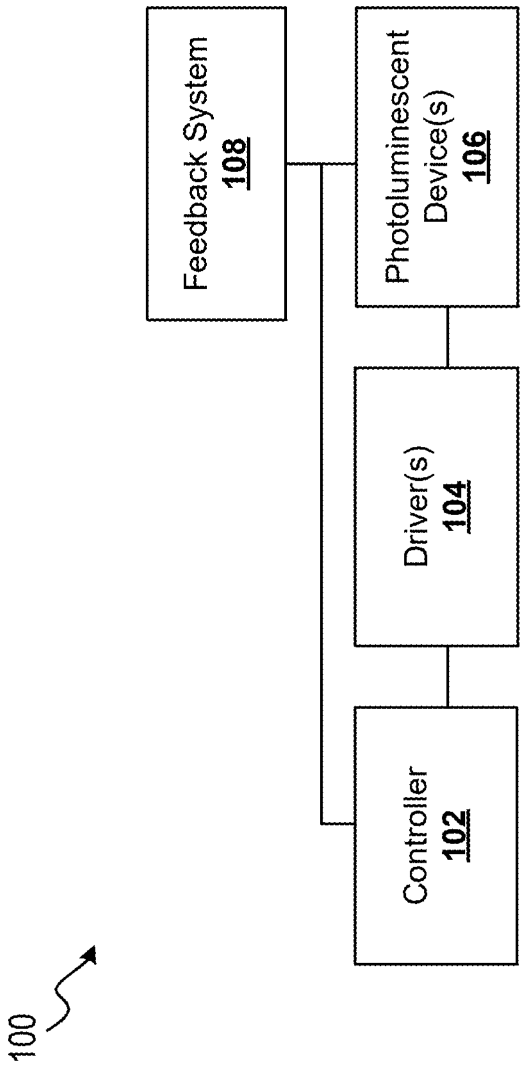
FIG. 6 illustrates a mixed halide perovskite spectra generator, in accordance with some embodiments of the present disclosure.

FIG. 6 depicts a block diagram of an example of a mixed halide perovskite spectra generator 100, consistent with some embodiments. In the illustrated example and describe herein, the mixed halide perovskite spectra generator 100 provides an example spectra generator. However, other spectra generators may be contemplated and fall under the scope of the present disclosure. It should be noted that the use of "spectra" or "spectrum" herein, unless otherwise noted, should not be limited to an entire range of wavelengths of electromagnetic radiation and may include portions (continuous or non-continuous) of the range of wavelengths of electromagnetic radiation. As discussed above, certain uses cases may only require a specific range or ranges of wavelengths. In some embodiments, the mixed halide perovskite spectra generator 100 may include a controller 102, a driver 104, a photoluminescent device 106, and a feedback system 108. The controller 102 may be electrically or communicatively coupled with the driver 104. The driver 104 may be electrically coupled with the photoluminescent device 106 to provide a pulsed signal or a continuous signal to the photoluminescent device 106. The feedback system 108 may be in communication with the controller 102 to provide feedback or to calibrate signals provided by the driver 104 based on the outputs of the photoluminescent device 106.

Specifically, in some aspects of the present disclosure, the controller 102 may include a digital controller such as a microcontroller, a field-programmable gate array (FPGA), a digital signal processor (DSP), an application-specific integrated circuit (ASIC), or other controller that would be apparent to one of skill in the art in possession of the present disclosure. In some embodiments, the controller 102 may be provided by the processors of the computer system 1200 described in the disclosure describing FIG. 12, discussed below. The type of controller/processor included in controller 102 may be selected depending on the desired resolution, timing precision, and system requirements.

Figure 7:
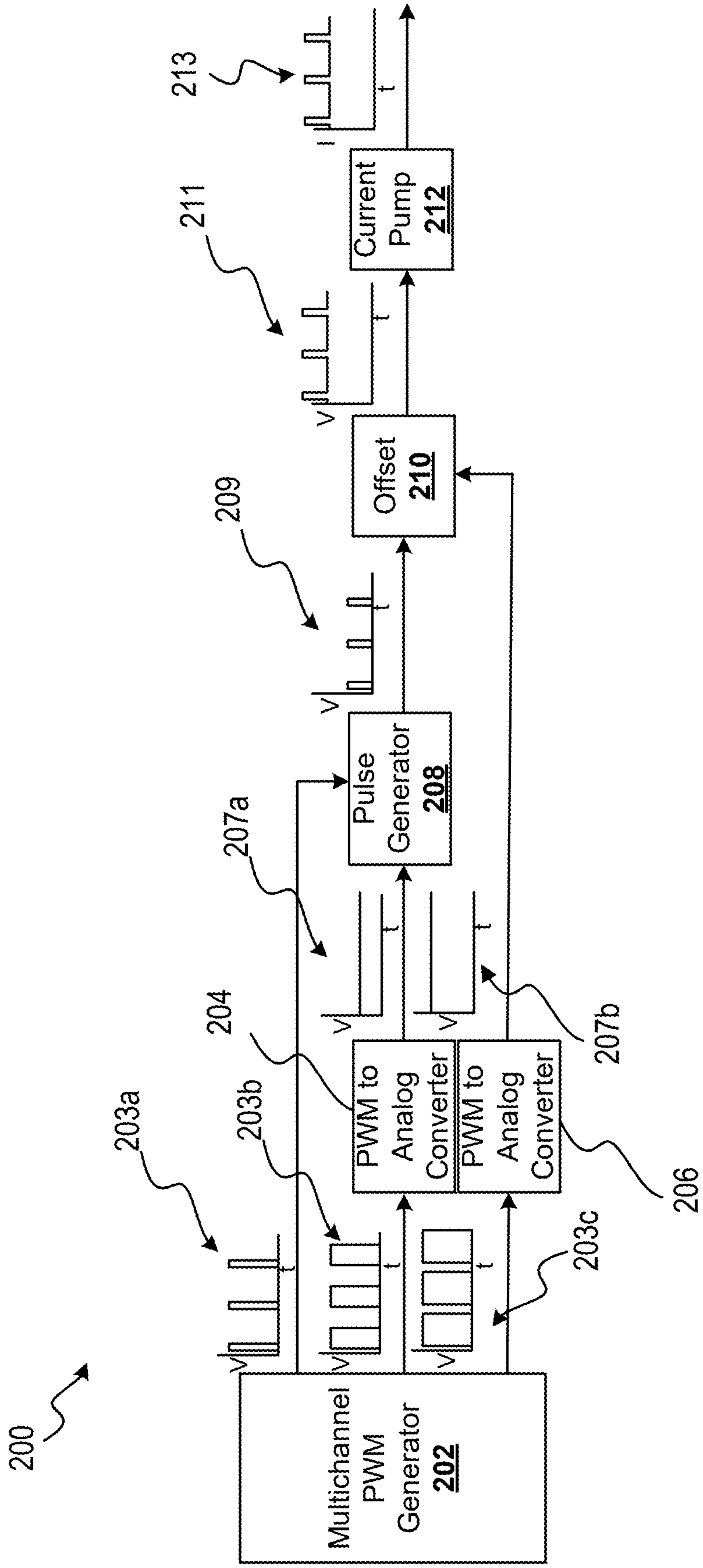
FIG. 7 illustrates an example embodiment of a driver of the mixed halide perovskite spectra generator of FIG. 6, in accordance with some embodiments of the present disclosure.

In some aspects of the present disclosure and discussed in further detail in FIG. 7, the driver 104 may include a multichannel pulse width modulation (PWM) generator that may be used to fine-tune a duty cycle of a pulsed signal to the photoluminescent device 106 and other characteristics of the pulsed signal to cause a light source to provide various intensities of illumination to a mixed halide perovskite film in the photoluminescent device 106. In other embodiments, the driver 104 may provide a continuous wave signal that may be adjusted to cause a light source to provide various intensities of illumination to the mixed halide perovskite film in the photoluminescent device 106. The driver 104 may be configured to provide a variety of ranges of power to create various intensities of light generated by a light source in the photoluminescent device 106 such that finer wavelength control of the mixed halide perovskite film can be achieved. The pulse width modulation generator may be multichannel to fine tune the signal provided to the photoluminescent device 106 or to provide signals to multiple light sources in the photoluminescent device 106 or provide signals to multiple photoluminescent devices 106.

In various aspects of the present disclosure, the mixed halide perovskite spectra generator 100 may include the photoluminescent device 106. The photoluminescent device 106 may include an emitter that includes a light source and a mixed halide perovskite film that may include one or more emitters of various compositions. FIGS. 8 and 9A-9E illustrate various embodiments of the photoluminescent device 106 and emitters and are described in further detail below.

In various aspects of the present disclosure, the mixed halide perovskite spectra generator 100 may include a feedback system 108. The feedback system 108 may include one or more sensors. In various aspects, the feedback system 108 may report the emission wavelength, the intensity, brightness, a measure of brightness within a certain wavelength range, or other characteristics of the light generated by the photoluminescent device 106 to the controller 102. In some embodiments, the feedback system 108 may include a spectrometer, a photocell with or without a filter, a photodiode or other sensors or light sensors that would be apparent to one of skill in the art in possession of the present disclosure. The feedback system 108 may be used as a calibration tool in which it is used once to characterize the photoluminescent device 106 and then the mixed halide perovskite spectra generator 100 may function without the feedback system 108. In other aspects, the feedback system 108 may be providing real-time feedback to provide real-time adjustments to the signals provided to the photoluminescent device 106 or multiple photoluminescent devices 106 by the driver(s) 104 to achieve a desired photoemission wavelength range/profile (e.g., photoemission peak or peaks having an adjustable center, width, or height) of individual emitters or a photoemission wavelength range/profile of multiple emitters acting together. Because the mixed halide perovskite material changes over time and use, the feedback system 108 may be able to communicate "degraded" outputs of the photoluminescent device 106 such that adjustments can be made to the signals provided to the photoluminescent device 106. As such, the feedback system 108 may be used based on a specific use case of the mixed halide perovskite spectra generator 100.

In some aspects, the mixed halide perovskite spectra generator 100 may include a heating and cooling system (not illustrated) that is adjacent the photoluminescent device 106 and communicatively coupled to the controller 102. A heater applied to the perovskite active material may accelerate the rate of segregation or mixing. Raising the temperature by 20° C. is enough to reduce the time to reset by a factor of 100. Heating also pushes up the duty cycle range for wavelength tuning facilitating higher intensity operation. Finally, there are some benefits that could be obtained with cooling including sharper emission peaks. The sharper the emission, the finer the degree of control when generating spectra. As such, the feedback system 108 may include a temperature sensor such as thermometer to regulate the temperature near the photoluminescent device 106 such that the controller 102 can regulate the heating and cooling system to generate a temperature at the photoluminescent device 106 that produces an photoemissions wavelength range or profile (e.g., photoemission peak or peaks having an adjustable center, width, or height) defined by the controller 102.

Efforts are directed toward accelerating the time required for the mixed halide perovskite spectra generator 100 output to reach a settled state. Upon modification of the excitation conditions, the material in the film of the photoluminescent device 106 asymptotically approaches a long-term equilibrium. To reduce the time required to achieve this equilibrium, a proportional-integral-derivative (PID) control approach may be implemented based on feedback from the system response. In this implementation, the PID control strategy involves applying an initial change in duty cycle greater than the calculated steady-state requirement, followed by a controlled reduction in duty cycle as the system response converges toward the target equilibrium value. While a specific example of the mixed halide perovskite spectra generator 100 is illustrated, one of skill in the art in possession of the present disclosure will recognize that different configurations may be contemplated without departing from the scope of the present disclosure. For example, the mixed halide perovskite spectra generator 100 may include multiple drivers 104, multiple photoluminescent devices 106, sub-controllers for each driver 104 and photoluminescent device 106 set, multiple photoluminescent devices 106 per each driver 104, multiple drivers 104 per each photoluminescent device 106 or other configurations without departing from the scope of the present disclosure.

FIG. 7 illustrates an embodiment of a driver 200 that may be the driver 104 discussed above with reference to FIG. 6. In the illustrated embodiment, the driver 200 includes a signal processing system for generating current pulses with precise voltage and timing characteristics. The driver 200 includes a multichannel pulse-width modulation (PWM) generator 202, one or more PWM-to-analog converters 204 and 206, a pulse generator 208, an offset module 210, and a current pump 212. The flow of data and signals progresses sequentially from left to right.

At the front end, the multichannel PWM generator 202 may produce multiple digital PWM signals, each represented by variable duty cycles. These PWM signals are indicative of different duty cycles, as shown by the time-domain voltage waveforms **203*a*, 203*b*, and 203*c* adjacent to each output line. These signals of the waveforms 203*b* and 203*c* are routed into PWM-to-analog converters 204 and 206, respectively, which convert the digital PWM signals into corresponding analog voltage levels 207*a* and 207*b***, respectively. This analog conversion may enable finer voltage control necessary for subsequent analog signal processing.

The analog signal from the converter 204 and the digital PWM signal from the channel represented by waveform **203*a* are then fed into a pulse generator 208. The pulse generator 208 combines or modulates these input signals to produce a composite voltage pulse train, again represented in time-domain as a periodic pulse signal 209. This pulse train is subsequently input into an offset module 210, which adjusts the baseline voltage level of the pulse signal 209 with the analog signal 207*b* to generate an offset-adjusted pulse signal 211. This offset allows for shifting the entire waveform vertically, enabling control over the absolute voltage values delivered downstream. In some aspects of the present disclosure, the offset module 210** is optional.

Finally, the offset-adjusted pulse signal 211 or the periodic pulse signal 209 is delivered to a current pump 212. The current pump 212 converts the offset-adjusted pulse signal 211 or the periodic pulse signal 209 into a corresponding current output signal 213, that may be suitable for driving a light source included in the photoluminescent device 106 to achieve a desired photoemission wavelength of the mix halide perovskite film included in the photoluminescent device 106. The rightmost waveform illustrates this final current-based signal, maintaining the timing of the original voltage pulses but delivered in the form of discrete current pulses. This modular architecture allows precise, multi-parameter control over the resulting output waveform-enabling fine-tuned current delivery shaped by independent PWM-controlled analog parameters, modulation schemes, and voltage offsets.

Figure 11:
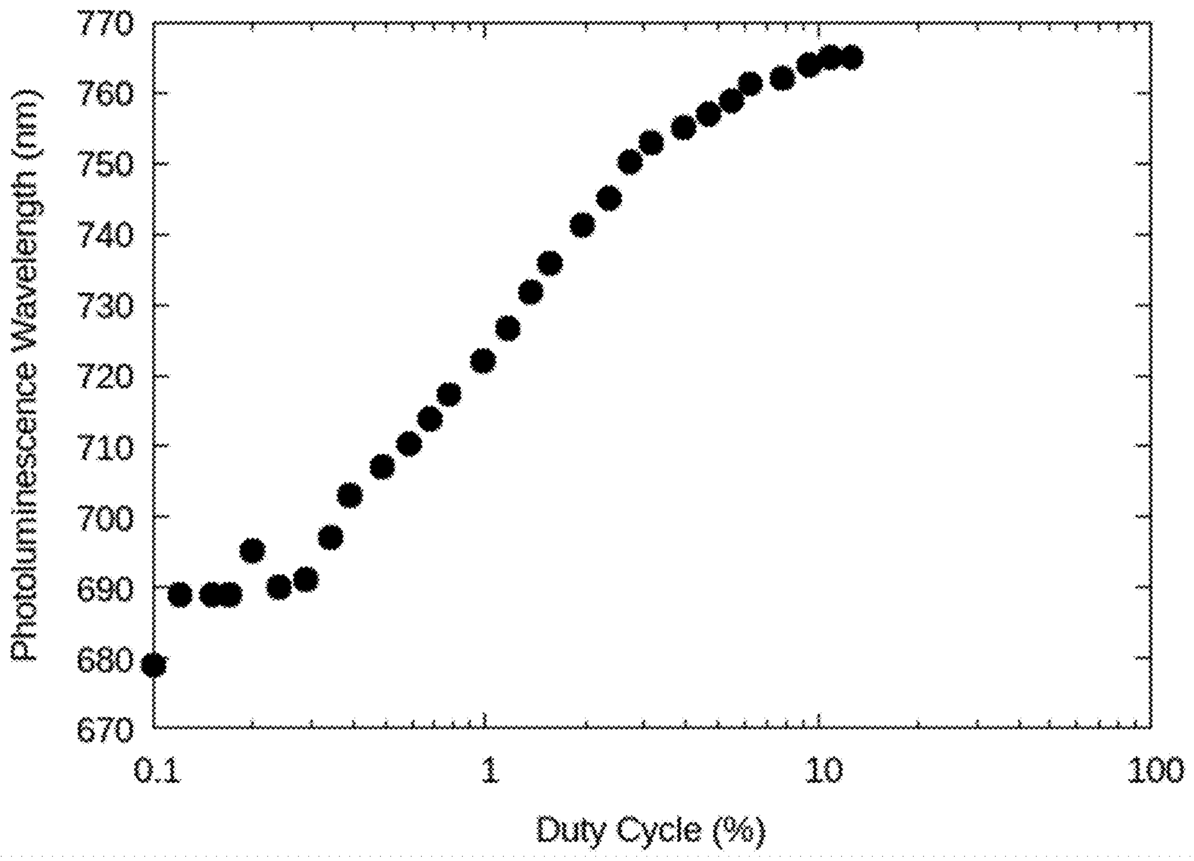
FIG. 11 illustrates a plot of photoluminescence wavelength versus duty cycle for a $FA_{0.85}Cs_{0.15}PbI_{1.5}Br_{1.5}$ film, in accordance with some embodiments of the present disclosure.

In a specific embodiment, the driver 200 includes a pulsed LED driver system. The pulsed LED driver system consists of multiple channels of PWM+analog dimming with analog dimming applied via current control. Both PWM and analog dimming are 12 bit (range of 4096), and the frequency range is 1-1600 hz. Two PWM signals are combined to create a pulse generator (pulse height and width control). One of the PWM signals is converted to an analog signal using an RC filter circuit. The analog signal and the second PWM signal are multiplied to result in the pulse generator 208. Then the signal from each pulse generator may go through an improved Howland current pump to change from voltage-based to current-based amplitude control. The minimum pulse width may be set by the slew rate of the op amp. About a 5 microsecond minimum pulse width may be used. Other op amps may push the slew time to 500 nanoseconds. FIG. 11 illustrates a plot 1100 of photoluminescence wavelength versus duty cycle for a $FA_{0.85}Cs_{0.15}PbI_{1.5}Br_{1.5}$ film. The data shows fine control of the photoluminescence peak position with a precision of <5 nm between each data point over a range of 690 to 765 nm.

Figure 8:
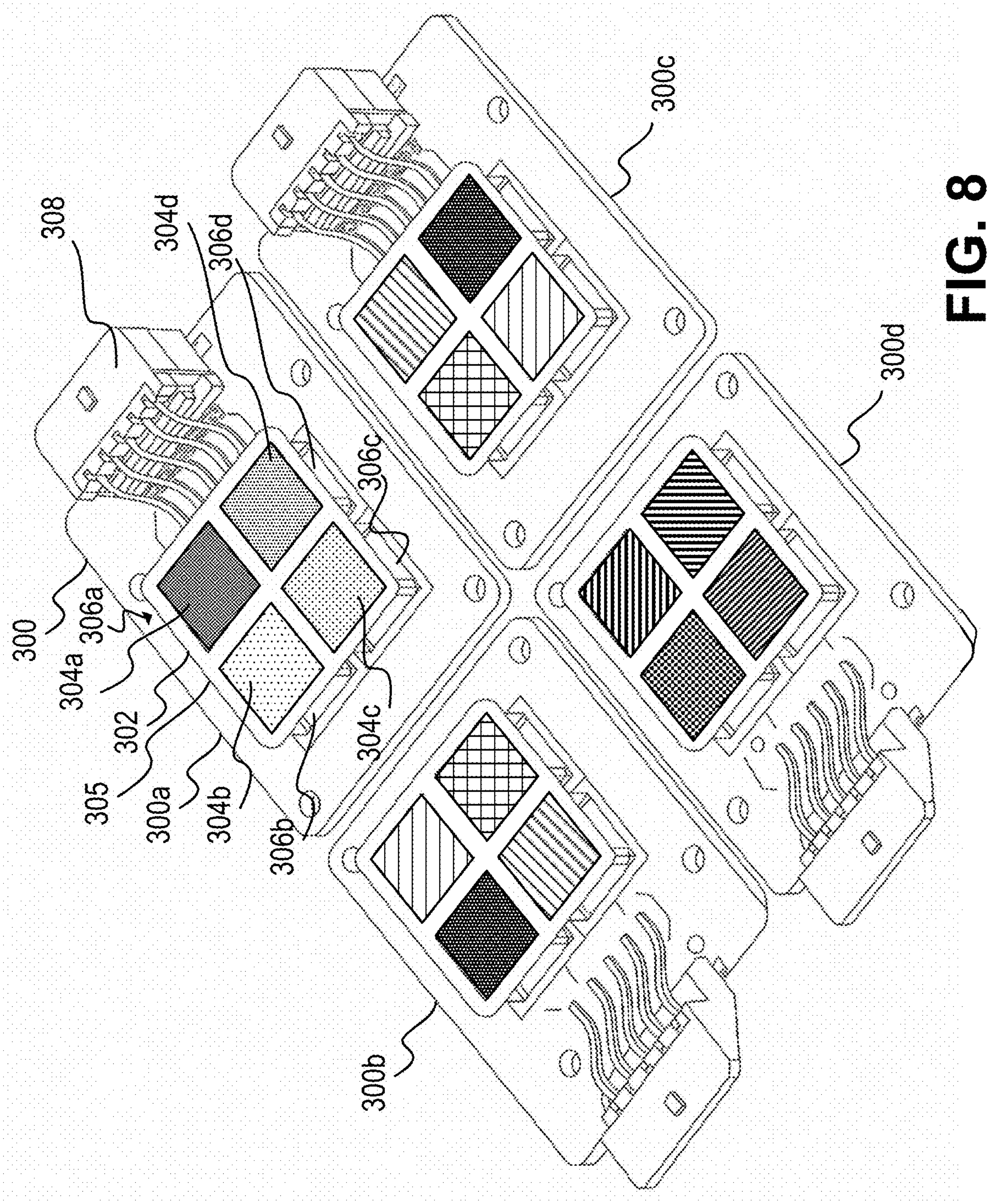
FIG. 8 illustrates an example embodiment of a photoluminescent device of the mixed halide perovskite spectra generator of FIG. 6, in accordance with some embodiments of the present disclosure.

FIG. 8 illustrates an embodiment of a photoluminescent device array 300 that may include one or more photoluminescent devices 300*a*, 300*b*, 300*c*, and 300*d* that each may be the photoluminescent device 106 discussed above with reference to FIG. 6. In a specific example, the photoluminescent devices 300*a-d* may be referred to as a huedaptable microspectral generator LED illumination board. As illustrated in FIG. 8, four photoluminescent devices are illustrated as being included in the photoluminescent device array 300. However, more or fewer photoluminescent devices may be provided in the photoluminescent device array 300 depending on the use case and how the photoluminescent device 300*a* is being driven by the driver 104. For example, intensity-based control over the emission wavelength may require more emitters and thus more photoluminescent devices than a pulsed excitation source control to for spectral generation purposes. For discussion purposes, the photoluminescent device 300*a* may be discussed throughout as an example embodiment of a photoluminescent devices 300*b*, 300*c*, or 300*d*.

Figure 10:
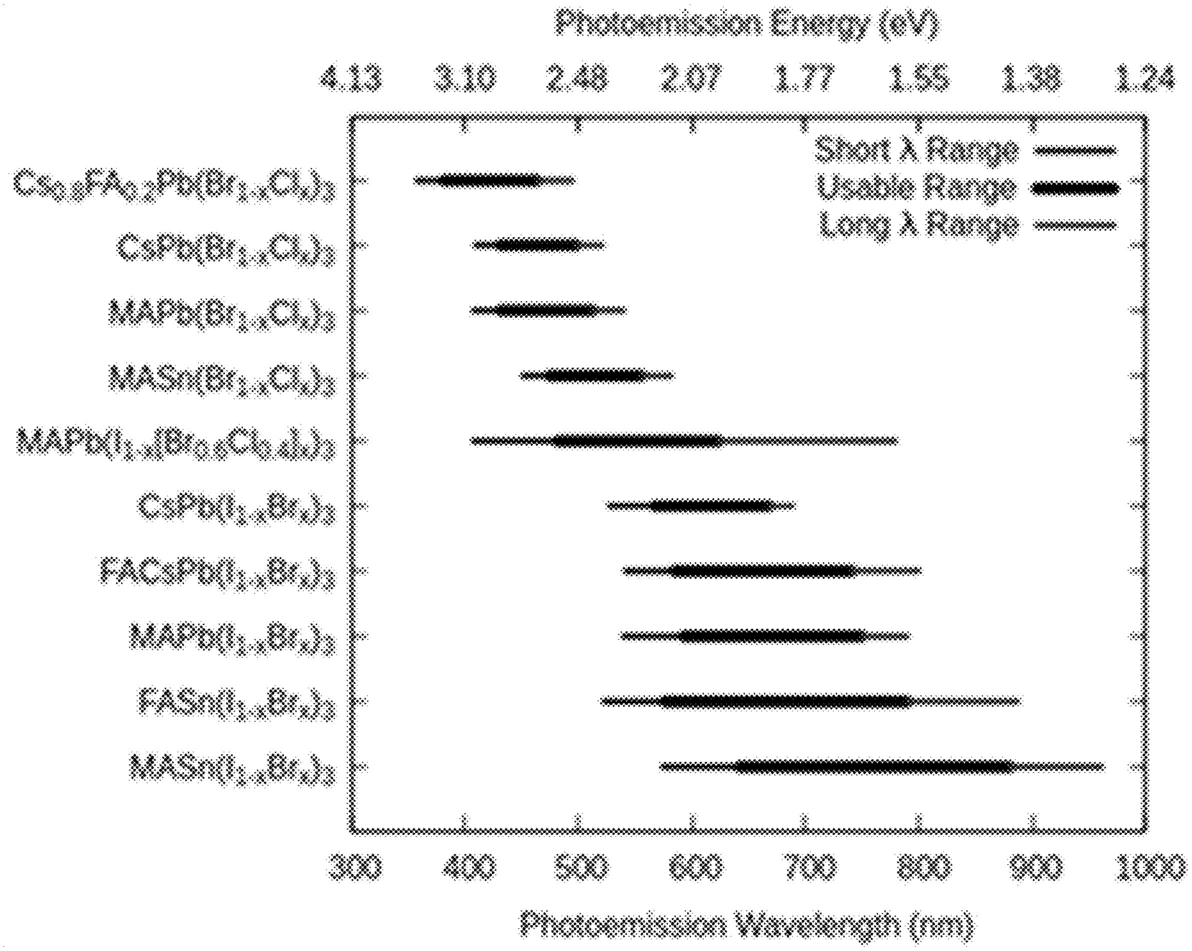
FIG. 10 illustrates a chart of various mixed halide perovskite materials along with their short λ range of photoemission wavelength, usable range, and long λ range, in accordance with some embodiments of the present disclosure.

The photoluminescent device 300*a* may include an emitter system 302 that may include one or more emitters (e.g., emitters 304*a*, 304*b*, 304*c*, or 304*d*). Each emitter 304*a*, 304*b*, 304*c*, or 304*d* may include a different mixed halide perovskite film 305*a*, 305*b*, 305*c*, and 305*d* such that each have different usable photoemission wavelength ranges and energy. However, some of the mixed halide perovskite films 305*a-d* may be of the same material. For example, FIG. 10 illustrates a chart 500 of various mixed halide perovskite materials along with their short λ range of photoemission wavelength, usable range photoemission wavelengths, and long λ range photoemission wavelengths. Emitters of photoluminescent devices 300*b*, 300*c*, and 300*d* may include a variety of mixed-halide perovskite thin films to cover various wavelength ranges and as such may differ from the emitters 304*a*, 304*b*, 304*c*, or 304*d* of the photoluminescent device 300*a*. The mixed halide perovskite film 305*a*, 305*b*, 305*c*, and 305*d* may be encapsulated or otherwise provided in a support matrix 305 such as glass or other non-opaque material. In some embodiments, the 16 emitters of the photoluminescent devices 300*a-d* may be able to provide a complete spectral range. Thus, each of the 16 emitters may be scaled together as a single tile (e.g., emitter system) and then those tiles of 4×4 patterns may be repeated to form a tiled wide area arbitrary spectrum generator. An advantage of using the mixed-halide perovskite over fixed-color LEDs is that two or more emitters can be tuned to the same color to fill in high intensity parts of the spectrum.

Each of the emitters 304*a*, 304*b*, 304*c*, or 304*d* may include a light source 306*a*, 306*b*, 306*c*, and 306*d*, respectively for each respective mixed halide perovskite film 305*a*, 305*b*, 305*c*, and 305*d*. For example, the light sources 306*a-d* may include an LED (e.g., a blue LED). Other light sources may include lasers or a combination of lasers and LEDs. The light sources 306*a*-306*d* may include a programmable LED array to back-illuminate a mixed-halide perovskite active layer (e.g., the mixed halide perovskite film 305*a*, 305*b*, 305*c*, and 305*d*). Individual LED elements may work together to generate a single monochromatic color. They may also work independently to generate more complex spectra for providing illumination to the mixed halide perovskite films 305*a-d*.

Figure 9A:
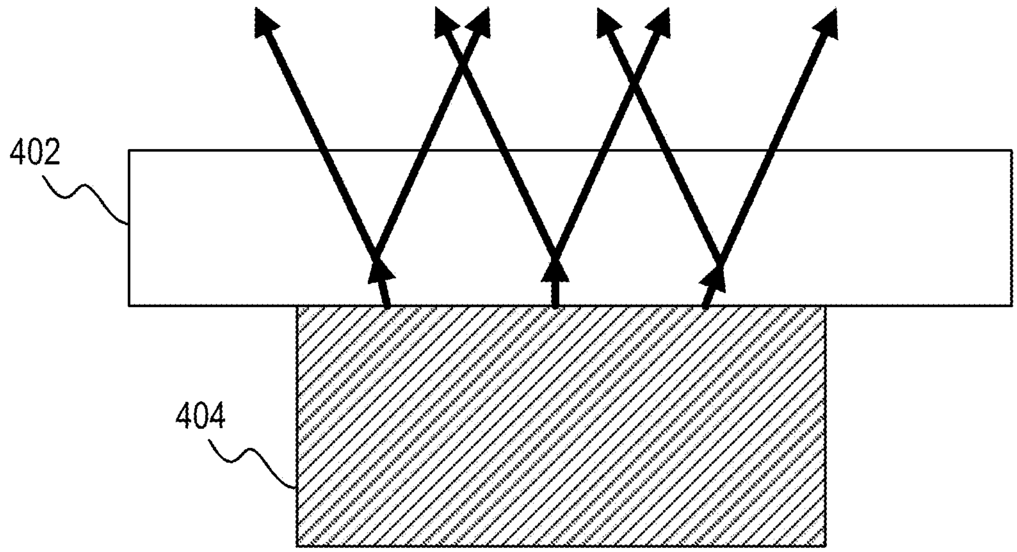
FIG. 9A illustrates a butt-join configuration of an emitter where a mixed-halide perovskite film is deposited directly on an LED, in accordance with some embodiments of the present disclosure.
Figure 9B:
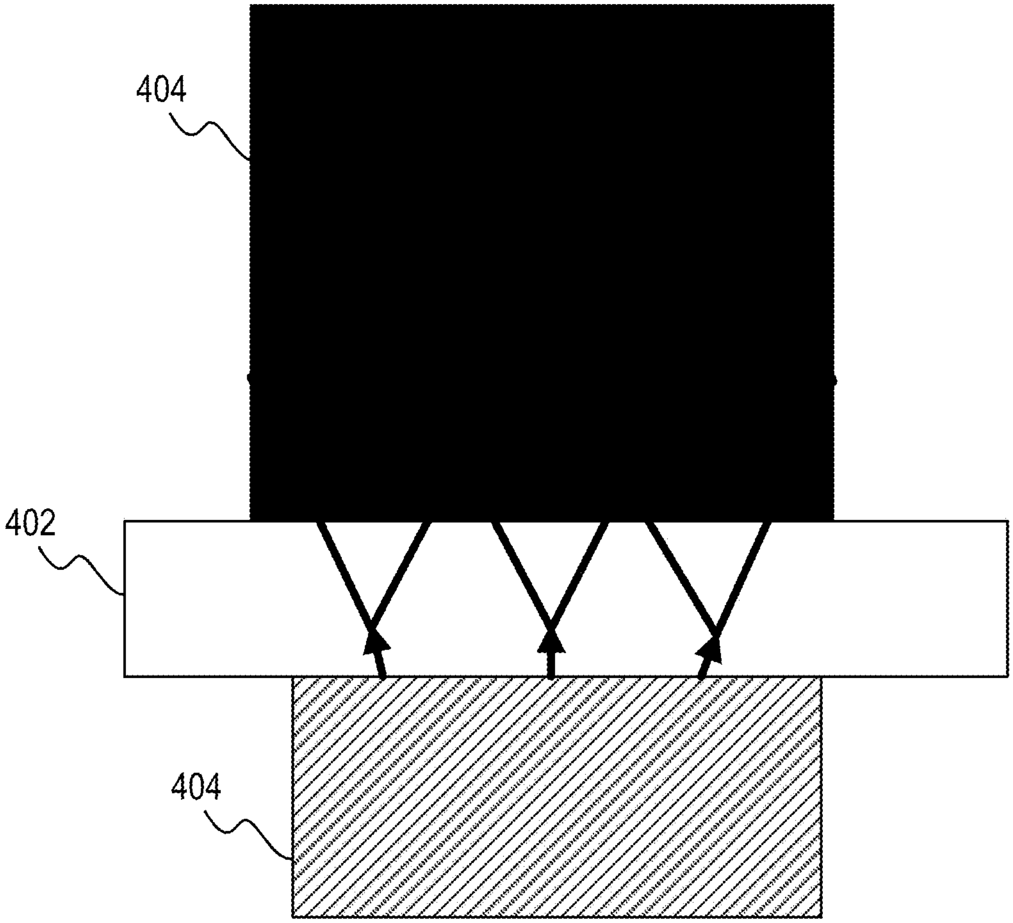
FIG. 9B illustrates a butt-join configuration of an emitter with an optical fiber where a mixed-halide perovskite film is deposited directly on an LED and an optical fiber directs photoemissions from the mixed-halide perovskite film, in accordance with some embodiments of the present disclosure
Figure 9C:
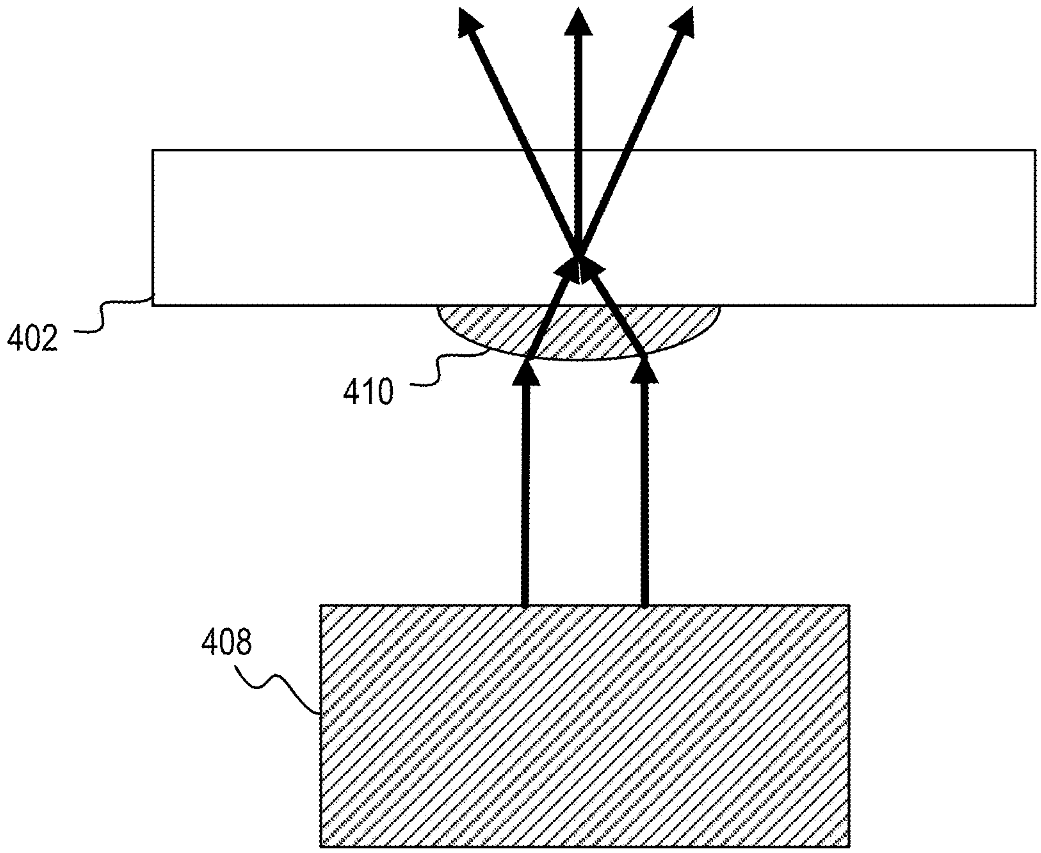
FIG. 9C illustrates a laser lens configuration of an emitter where a laser may be directed at a lens to form a beam spot on the mixed-halide perovskite film, in accordance with some embodiments of the present disclosure.
Figure 9D:
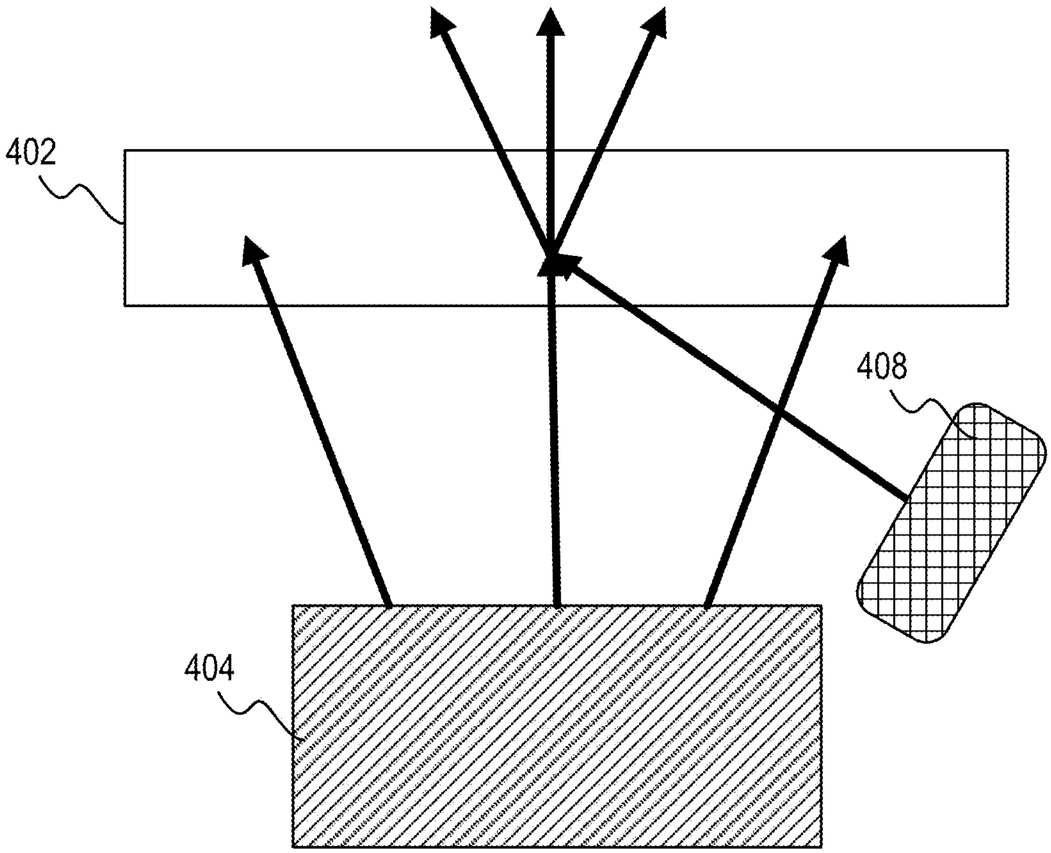
FIG. 9D illustrates a converged arrangement configuration of an emitter where two or more light sources such as the LED and the laser converge their illumination on the same area of the mixed-halide perovskite film, in accordance with some embodiments of the present disclosure.
Figure 9E:
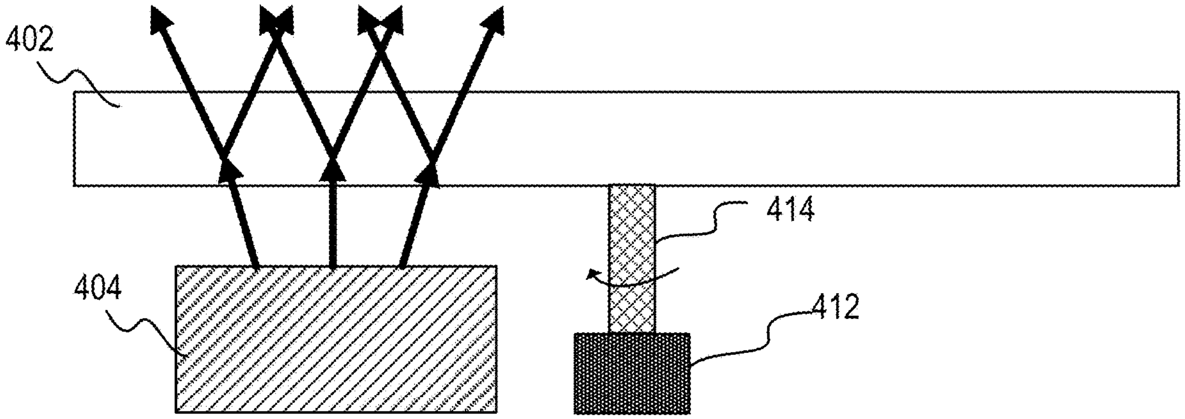
FIG. 9E illustrates a motion arrangement configuration of an emitter where the LED illuminates the mixed-halide perovskite film that is coupled to a motor that spins the mixed-halide perovskite film via a spindle coupled to the motor and the mixed-halide perovskite film, in accordance with some embodiments of the present disclosure.

FIGS. 9A, 9B, 9C, 9D, and 9E illustrate various arrangements of the light source 306*a* and mixed halide perovskite film 305*a* included in emitter 304*a* combination. FIG. 9A illustrates a butt-join configuration where a mixed-halide perovskite film 402 is deposited directly on an LED 404. FIG. 9B illustrates the butt-join configuration of FIG. 9A but with an added optical fiber 406 over the illumination area of the mixed-halide perovskite film 402. The optical fiber 406 may be added to other embodiments of arrangements of the light source 306*a* and emitter 304*a* combination, discussed below. FIG. 9C illustrates a laser lens configuration where a laser 408 may be directed at a lens 410 to form a beam spot on the mixed-halide perovskite film 402. FIG. 9D illustrates a converged arrangement where two or more light sources such as the LED 404 and the laser 408 converge their illumination on the same area of the mixed-halide perovskite film 402. The LED 404 may act as the control to tune the material. Then a high fluence pulsed laser may generate a coherent beam from amplified stimulated emission. FIG. 9E illustrates a motion arrangement where the LED 404 illuminates the mixed-halide perovskite film 402 that is coupled to a motor 412 that spins the mixed-halide perovskite film 402 via a spindle 414 coupled to the motor 412 and the mixed-halide perovskite film 402. While a few example configurations of various light sources and mixed-halide perovskite films are illustrated in FIGS. 9A-9E, one of skill in the art in possession of the present disclosure will recognize that other configurations are possible and those configurations may include combinations of the various components illustrated in FIGS. 9A-9E. Also, while light sources are illustrated to provide photoluminescent excitation modes for exciting the mixed-halide perovskite films, it is contemplated that electroluminescent excitation modes are possible such that electrical signals interacting directly with the emitters 304*a* may achieve the same effect.

Figure 12:
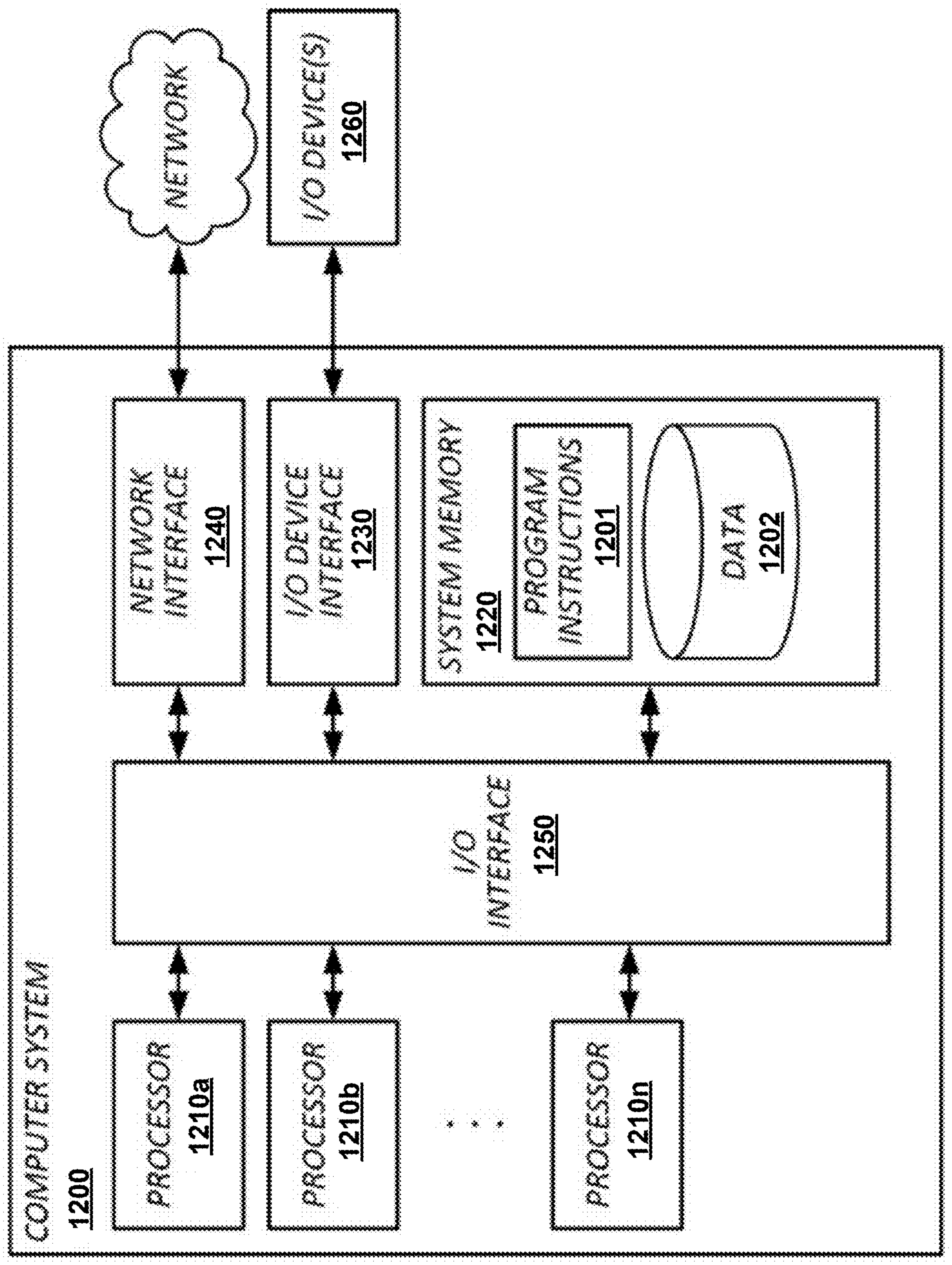
FIG. 12 illustrates an example of a computer system that may be implemented by devices illustrated in FIG. 6, in accordance with some embodiments of the present disclosure.

Thus, the systems and method of the present disclosure provide a mixed-halide perovskite spectra generator that provides a tunable, high-fidelity light source capable of replicating solar and application-specific spectra with improved precision and efficiency. By leveraging the photosegregation and photomixing behavior of mixed-halide perovskite materials, the disclosed system enables real-time control over emission wavelengths through modulated excitation conditions. This approach eliminates the need for complex filtering and enhances spectral accuracy using narrow, adjustable emission peaks. The system architecture that includes a controller, driver, photoluminescent device, and optional feedback mechanism may support dynamic spectral tuning, scalability, and fine resolution over broad wavelength ranges. Applications include solar simulation, hyperspectral imaging, biological research, fiber-optic sensing, and advanced illumination. Compared to traditional LED or lamp-based simulators, the present system offers reduced component complexity, higher spectral conformity, and a compact, modular design. The system and methods thereby provides an adaptable and efficient solution for generating precise optical spectra across a wide array of technical domains. FIG. 12 is a diagram that illustrates an exemplary computing system 1200 in accordance with embodiments of the present technique. Various portions of systems and methods described herein, may include or be executed on one or more computing systems similar to computing system 1200. Further, processes and modules described herein may be executed by one or more processing systems similar to that of computing system 1200.

Computing system 1200 may include one or more processors (e.g., processors 1210*a*-1210*n*) coupled to system memory 1220, an input/output I/O device interface 1230, and a network interface 1240 via an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1220). Computing system 1200 may be a uni-processor system including one processor (e.g., processor 1210*a*), or a multi-processor system including any number of suitable processors (e.g., 1210*a*-1210*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1200 may include a plurality of computing devices (e.g., distributed computing systems) to implement various processing functions.

I/O device interface 1230 may provide an interface for connection of one or more I/O devices 1260 to computing system 1200. I/O devices may include devices that receive input (e.g., from a user) or output information (e.g., to a user). I/O devices 1260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1260 may be connected to computing system 1200 through a wired or wireless connection. I/O devices 1260 may be connected to computing system 1200 from a remote location. I/O devices 1260 located on remote computing system, for example, may be connected to computing system 1200 via a network and network interface 1240.

Network interface 1240 may include a network adapter that provides for connection of computing system 1200 to a network. Network interface 1240 may facilitate data exchange between computing system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may be configured to store program instructions 1201 or data 1202. Program instructions 1201 may be executable by a processor (e.g., one or more of processors 1210*a*-1210*n*) to implement one or more embodiments of the present techniques. Instructions 1201 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1220 may include a non-transitory computer readable storage medium that may have program instructions stored thereon that are executable by a computer processor (e.g., one or more of processors 1210*a*-1210*n*) to cause the subject matter and the functional operations described herein. A memory (e.g., system memory 1220) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210*a*-1010*n*, system memory 1220, network interface 1240, I/O devices 1260, or other peripheral devices. I/O interface 1250 may perform protocol, timing, or other data transformations to convert data signals from one component (e.g., system memory 1220) into a format suitable for use by another component (e.g., processors 1210*a*-1210*n*). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1200 or multiple computing systems 1200 configured to host different portions or instances of embodiments. Multiple computing systems 1200 may provide for parallel or sequential processing/execution of one or more portions of the techniques described herein.

Those skilled in the art will appreciate that computing system 1200 is merely illustrative and is not intended to limit the scope of the techniques described herein. Computing system 1200 may include any combination of devices or software that may perform or otherwise provide for the performance of the techniques described herein. For example, computing system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

Clause 1. A system, comprising: a first emitter that includes: a first mixed halide perovskite film that includes a first type mixed halide perovskite material that possesses a first usable photoemission wavelength range; and a first excitation device that is positioned adjacent to the first mixed halide perovskite film based on an excitation mode of the first excitation device and the first excitation device is configured to: tune, based on a first instruction, the first mixed halide perovskite film to emit a first photoemission peak within the first usable photoemission wavelength range; and tune, based on a second instruction, the first mixed halide perovskite film to emit a second photoemission peak within the first usable photoemission wavelength range, wherein the second photoemission peak is different than the first photoemission peak.

Clause 2. The system of clause 1, further comprising: a second emitter that is coupled to the first emitter in an array and that includes: a second mixed halide perovskite film that includes a second type mixed halide perovskite material that possesses a second usable photoemission wavelength range wherein at least a portion of the second usable photoemission wavelength range is different than the first usable photoemission wavelength range and at least a portion of the first usable photoemission wavelength range is different than the second usable photoemission wavelength range; and a second excitation device that is positioned adjacent to the second mixed halide perovskite film based on an excitation mode of the second excitation device and the second excitation device is configured to: tune, based on a third instruction, the second mixed halide perovskite film to emit a third photoemission peak within the second usable photoemission wavelength range; and tune, based on a fourth instruction, the second mixed halide perovskite film to emit a fourth photoemission peak within the second usable photoemission wavelength range, wherein the fourth photoemission peak is different than the third photoemission peak.

Clause 3. The system of clause 2, wherein the third photoemission peak includes at least a first portion of the at least a portion of the second usable photoemission wavelength range that is different than the first usable photoemission wavelength range such that when the first emitter and the second emitter are excited simultaneously according to the first instruction and the third instruction, respectively, the first photoemission peak and the third photoemission peak generate a photoemission wavelength combined range that is not achievable by either the first mixed halide perovskite film or the second mixed halide perovskite film alone.

Clause 4. The system of clause 2, wherein the third photoemission peak is substantially similar to the first photoemission peak such that when the first emitter and the second emitter are excited simultaneously according to the first instruction and the third instruction, respectively, the first photoemission peak and the third photoemission peak generate an photoemission intensity that is more intense than a photoemission intensity of the first mixed halide perovskite film or the second mixed halide perovskite film alone.

Clause 5. The system of clause 1, wherein the tuning of the second photoemission peak includes tuning the first mixed halide perovskite film from a time when the first mixed halide perovskite film is in the first photoemission peak.

Clause 6. The system of clause 5, wherein the tuning the second photoemission peak includes longer photoemission wavelengths than the first photoemission peak such that the first excitation device causes a photosegregation effect on the first mixed halide perovskite film.

Clause 7. The system of clause 6, wherein the first excitation device includes a light source and the second photoemission peak is achieved by increasing an intensity of a photoemission of the light source on the first mixed halide perovskite film that is used to tune the first photoemission peak.

Clause 8. The system of clause 5, wherein the tuning the second photoemission peak includes shorter photoemission wavelengths than the first photoemission peak such that the first excitation device causes a photoremixing effect on the first mixed halide perovskite film.

Clause 9. The system of clause 8, wherein the first excitation device includes a light source and the second photoemission peak is achieved by increasing an intensity of a photoemission of the light source on the first mixed halide perovskite film that is used to tune the first photoemission peak, and wherein the intensity is increased by a first factor that causes photoremixing rather than photosegregation, where the photosegregation lengthens photoemission wavelengths when the intensity is increased by a smaller factor than the first factor.

Clause 10. The system of clause 1, wherein the first excitation device includes a light source, and the light source tunes the first mixed halide perovskite film from emitting the first photoemission peak to emitting the second photoemission peak by pulsed illumination.

Clause 11. The system of clause 10, wherein the light source includes at least one of a light emitting diode (LED) or a laser.

Clause 12. The system of clause 10, wherein the light source causes a change from the first photoemission peak to the second photoemission peak by adjusting at least one of one a duty cycle or an intensity of the pulsed illumination.

Clause 13. The system of clause 10, further comprising: a pulsed driver that is electrically coupled to the light source that is configured to: provide a first pulsed signal to the light source to generate first pulsed illumination to achieve the first photoemission peak; and provide a second pulsed signal to the light source to generate second pulsed illumination to achieve the second photoemission peak.

Clause 14. The system of clause 13, wherein the second pulsed signal is determined based on a current photoemission peak emitted from the first mixed halide perovskite film.

Clause 15. The system of clause 1, further comprising: a means for driving the first excitation device to tune the first mixed halide perovskite film to emit the first photoemission peak within the first usable photoemission wavelength range.

Clause 16. The system of clause 1, further comprising: a means for generating a photoemission spectrum within a 5% error tolerance of a class A+solar spectrum.

Clause 17. The system of clause 1, further comprising: a controller; and a feedback system that includes at least one light detection sensor, wherein the controller is configured to: receive a detection of the first photoemission peak by the feedback system; determine that the detected first photoemission peak is not within an error tolerance of a predetermined first photoemission peak; and updating the first instruction such that a photoemission peak emitted by the first mixed halide perovskite film is within the error tolerance of the predetermined first photoemission peak.

Clause 18. The system of clause 1, wherein the excitation mode is at least one of an electroluminescent excitation mode or a photoluminescent excitation mode.

Clause 19. A system, comprising: a controller; a driver that is coupled to the controller, that receives instructions from the controller, and that is configured to control voltage characteristics of a signal; and a photoluminescent emitter device that is coupled to an output of the driver to receive the signal and that includes: a light source; and a mixed halide perovskite film positioned adjacent to the light source such that a photoemission emitted from the light source excites the mixed halide perovskite film to generate a photoemission peak of a usable photoemission wavelength range of a type of mixed halide perovskite material used in the mixed halide perovskite film.

Clause 20. The system of clause 19, wherein the driver configured to the control voltage characteristics of the signal includes the driver being configured to generate a pulsed signal to provide to the light source that causes the light source to generate pulsed illumination to achieve a desired photoemission peak, wherein at least one of an intensity and a duty cycle of the pulsed illumination is adjustable by the driver to achieve the desired photoemission peak by both photosegregation and photoremixing depending on a current photoemission peak being emitted by the mixed halide perovskite film.

What is claimed is:

1. A system, comprising:

a first emitter that includes:

a first mixed halide perovskite film that includes a first type mixed halide perovskite material that possesses a first usable photoemission wavelength range; and a first excitation device that is positioned adjacent to the first mixed halide perovskite film based on an excitation mode of the first excitation device and the first excitation device is configured to:

tune, based on a first instruction, the first mixed halide perovskite film to emit a first photoemission peak within the first usable photoemission wavelength range; and tune, based on a second instruction, the first mixed halide perovskite film to emit a second photoemission peak within the first usable photoemission wavelength range, wherein the second photoemission peak has at least one of a different width or center within the first usable photoemission wavelength range than the first photoemission peak.

2. The system of claim 1, further comprising:

a second emitter that is coupled to the first emitter in an array and that includes:

a second mixed halide perovskite film that includes a second type mixed halide perovskite material that possesses a second usable photoemission wavelength range wherein at least a portion of the second usable photoemission wavelength range is different than the first usable photoemission wavelength range and at least a portion of the first usable photoemission wavelength range is different than the second usable photoemission wavelength range; and a second excitation device that is positioned adjacent to the second mixed halide perovskite film based on an excitation mode of the second excitation device and the second excitation device is configured to:

tune, based on a third instruction, the second mixed halide perovskite film to emit a third photoemission peak within the second usable photoemission wavelength range; and tune, based on a fourth instruction, the second mixed halide perovskite film to emit a fourth photoemission peak within the second usable photoemission wavelength range, wherein the fourth photoemission peak is different than the third photoemission peak.

3. The system of claim 2, wherein the third photoemission peak includes at least a first portion of the at least a portion of the second usable photoemission wavelength range that is different than the first usable photoemission wavelength range such that when the first emitter and the second emitter are excited simultaneously according to the first instruction and the third instruction, respectively, the first photoemission peak and the third photoemission peak generate a photoemission wavelength combined range that is not achievable by either the first mixed halide perovskite film or the second mixed halide perovskite film alone.

4. The system of claim 2, wherein the third photoemission peak is substantially similar to the first photoemission peak such that when the first emitter and the second emitter are excited simultaneously according to the first instruction and the third instruction, respectively, the first photoemission peak and the third photoemission peak generate an photoemission intensity that is more intense than a photoemission intensity of the first mixed halide perovskite film or the second mixed halide perovskite film alone.

5. The system of claim 1, wherein the tuning of the second photoemission peak includes tuning the first mixed halide perovskite film from a time when the first mixed halide perovskite film is in the first photoemission peak.

6. The system of claim 5, wherein the tuning the second photoemission peak includes longer photoemission wavelengths than the first photoemission peak such that the first excitation device causes a photosegregation effect on the first mixed halide perovskite film.

7. The system of claim 6, wherein the first excitation device includes a light source and the second photoemission peak is achieved by increasing an intensity of a photoemission of the light source on the first mixed halide perovskite film that is used to tune the first photoemission peak.

8. The system of claim 5, wherein the tuning the second photoemission peak includes shorter photoemission wavelengths than the first photoemission peak such that the first excitation device causes a photoremixing effect on the first mixed halide perovskite film.

9. The system of claim 8, wherein the first excitation device includes a light source and the second photoemission peak is achieved by increasing an intensity of a photoemission of the light source on the first mixed halide perovskite film that is used to tune the first photoemission peak, and wherein the intensity is increased by a first factor that causes photoremixing rather than photosegregation, where the photosegregation lengthens photoemission wavelengths when the intensity is increased by a smaller factor than the first factor.

10. The system of claim 1, wherein the first excitation device includes a light source, and the light source tunes the first mixed halide perovskite film from emitting the first photoemission peak to emitting the second photoemission peak by pulsed illumination.

11. The system of claim 10, wherein the light source includes at least one of a light emitting diode (LED) or a laser.

12. The system of claim 10, wherein the light source causes a change from the first photoemission peak to the second photoemission peak by adjusting at least one of one a duty cycle or an intensity of the pulsed illumination.

13. The system of claim 10, further comprising:

a pulsed driver that is electrically coupled to the light source that is configured to:

provide a first pulsed signal to the light source to generate first pulsed illumination to achieve the first photoemission peak; and provide a second pulsed signal to the light source to generate second pulsed illumination to achieve the second photoemission peak.

14. The system of claim 13, wherein the second pulsed signal is determined based on a current photoemission peak emitted from the first mixed halide perovskite film.

15. The system of claim 1, further comprising:

a means for driving the first excitation device to tune the first mixed halide perovskite film to emit the first photoemission peak within the first usable photoemission wavelength range.

16. The system of claim 1, further comprising: a means for generating a photoemission spectrum within a 5% error tolerance of a class A+solar spectrum.

17. The system of claim 1, further comprising:

a controller; and a feedback system that includes at least one light detection sensor, wherein the controller is configured to:

receive a detection of the first photoemission peak by the feedback system;

determine that the detected first photoemission peak is not within an error tolerance of a predetermined first photoemission peak; and updating the first instruction such that a photoemission peak emitted by the first mixed halide perovskite film is within the error tolerance of the predetermined first photoemission peak.

18. The system of claim 1, wherein the excitation mode is at least one of an electroluminescent excitation mode or a photoluminescent excitation mode.

* * * * *